United States Patent

Brown

[11] Patent Number: 5,854,904
[45] Date of Patent: Dec. 29, 1998

[54] OBJECT-ORIENTED MODULAR ELECTRONIC COMPONENT SYSTEM

[76] Inventor: Erik Lee Brown, 1584 Hartford Turnpike Apt. #2, Oakdale, Conn. 06370

[21] Appl. No.: 730,180

[22] Filed: Oct. 15, 1996

[51] Int. Cl.⁶ ........................................... G06F 1/16
[52] U.S. Cl. ..................... 395/280; 395/50; 395/700; 361/395
[58] Field of Search ................ 395/280, 50, 700; 361/395; 307/53, 33; 364/483

[56] References Cited

U.S. PATENT DOCUMENTS

| | | |
|---|---|---|
| 3,164,432 | 1/1965 | Feigenbaum . |
| 3,309,577 | 3/1967 | Roll, Jr. . |
| 3,497,281 | 2/1970 | Wilde . |
| 4,538,073 | 8/1985 | Freige et al. ............................. 307/33 |
| 4,680,674 | 7/1987 | Moore ..................................... 364/395 |
| 4,702,535 | 10/1987 | Beun . |
| 4,934,764 | 6/1990 | Leitermann et al. . |
| 5,216,579 | 6/1993 | Basara et al. . |
| 5,227,957 | 7/1993 | Deters ..................................... 361/395 |
| 5,236,259 | 8/1993 | Ryan et al. . |
| 5,426,564 | 6/1995 | Hsu ........................................ 361/707 |
| 5,431,491 | 7/1995 | Melgaard et al. . |
| 5,486,982 | 1/1996 | Hsu . |
| 5,522,077 | 5/1996 | Cuthbert et al. ........................ 395/700 |
| 5,644,686 | 7/1997 | Hekmatpour ............................ 395/50 |

*Primary Examiner*—Ayaz R. Sheikh
*Assistant Examiner*—Eric S. Thlang
*Attorney, Agent, or Firm*—Albert W. Hilburger

[57] ABSTRACT

An object-oriented modular electronic component system comprises a plurality of self-contained operating modules, each having external mechanical and electromagnetic interconnecting devices. It includes a user module for performing a specific function, a database module for identifying the presence, location, and function of each of the operating modules of the system, a communications module for transmitting digital electromagnetic messages among the operating modules, a power supply module for providing electrical power to the operating modules, and a power bus device for delivering power from the power supply module to the operating modules. The communications module, the power supply module, the data base module, and the user module are all capable of being selectively operatively releasably connected, mechanically and electromagnetically. The modules are all electromagnetically disconnected in an inoperative mode and are electromagnetically connected in an operative mode. With this arrangement, operation of the modular object-oriented electronic component system may be achieved without accessing the interior of any of the operating modules. A self-contained power bus module has external mechanical and electromagnetic interconnecting devices for proper interconnection with the power supply module and with each of the user modules. The communications module is responsive to the presence of each of the other operating modules, when in the operative mode, to determine the parameters necessary for transmitting the digital electromagnetic messages among all of the modules. A specialization module may be provided for transmitting non-digital and trigger pulse type electrical signals among the user modules.

17 Claims, 21 Drawing Sheets

PRIOR ART

OBJECT-ORIENTED MODULAR ELECTRONIC COMPONENT SYSTEM

BACKGROUND OF THE INVENTION

1. Field of the Invention

The present invention relates generally to a modular electronic component system and, more particularly, to such a system in which all components are enclosed modules which, when joined together mechanically and electromagnetically, provide the user with a system tailored to his or her needs. There is no requirement to gain entry to any module and all "handshaking" is achieved automatically. Modules may be added or removed from the system as desired by the user.

2. Description of the Prior Art

The concept of building electronic modular systems is not new and the prior art is replete with a variety of disclosures of such systems. For example, U.S. Pat. No. 3,164,432 to Feigenbaum and U.S. Pat. No. 3,309,577 to Roll, Jr. disclose multiple electrical components which are rack mounted.

U.S. Pat. No. 3,497,281 to Wilde discloses standardized modular enclosures and mounting devices useful for storage of various materials or for enclosing various items of equipment including electronic equipment. The modular enclosures may be quickly and easily mounted and removed and the modular enclosures and their mounting devices are standardized to provide a safe and convenient means of introducing electrical or other inputs to the modular enclosure.

U.S. Pat. No. 4,702,535 to Beun discloses an electronic equipment drawer assembly which comprises a cabinet having an opening in its front and a drawer slidably mounted in the cabinet through the opening. The drawer can be moved into or out of the cabinet for servicing and includes sets of opposed tracks for slidably retaining a plurality of circuit boards. Also included is a readily replaceable faceplate assembly mounted on a printed circuit board which in turn, slides into the drawer. To ensure damage does not occur to the printed circuit board, when the drawer is opened or closed by a force applied to the faceplate, the unit is designed so that such a force is transferred directly to the drawer and not through the printed circuit board to the drawer.

U.S. Pat. No. 4,934,764 to Leitermann et al. discloses a computer system module assembly which includes modular equipment enclosures slidable and securable in a modular exoskeletal frame structure on a base. The frame structure includes horizontal frame members on which the enclosures slide with pawls movable on a threaded rod to engage studs on the enclosures to clamp the enclosure to the frame. Air cooling is provided for each enclosure.

U.S. Pat. No. 5,216,579 to Basara et al. discloses an assembly of chases or plenums disposed on the exterior of a rack supporting discrete computer, disk drive, communications, storage and similar electronic modules to provide input/output cable management, cooling passages to supply cooling air to each of the electronic units, and a power distribution chase to manage the power distribution to the separate electronic modules. The cable management chase provides efficient storage of excess cable length to improve appearance and efficiency of electronic module installation.

U.S. Pat. No. 5,227,957 to Deters discloses a modular computer chassis with a passive backplane provided for a personal computer system with a plurality of open-ended and vertically or horizontally interconnectable bays, or a single case with bays, for slidably receiving component trays each having a printed double sided bus direction adaptor board with a bus connector at one end and a female bus connector mounted to the top surface for attaching an expansion card parallel to the board. The end bus connector extends through the back wall of the tray to connect to a female bus connector on a passive backplane connector board attached to the back of the chassis. The adaptor board converts the established bus connection between the card and female bus connector 90 degrees to the bus connector at the rear of the tray. The bays connect and hold standard off-the-shelf personal computer components, and additional bays may be added and connected to the system, or used at remote locations, by means of an external cable harness or cable connector which attaches to the backplane board.

U.S. Pat. No. 5,236,259 to Ryan et al. discloses a tower unit for a personal computer comprising a generally rectangular box having a generally rectangular interior chassis. The interior chassis includes a first set of interiorly extending mounting flanges and tabs which are positioned and aligned on opposing chassis walls to mount one or more drives at an upwardly facing angle in order to allow the user visual and manual access to the drives for ease of operation. A similar combination of interiorly directed tabs and flanges are formed in the opposing side walls of the frame near the bottom of the tower unit chassis in order to mount a plurality of hard disk drives in horizontal positions.

U.S. Pat. No. 5,431,491 to Melgaard et al. discloses a method and apparatus for automatically inserting and ejecting electrical connectors of electronic component test trays from electrical connectors in a panel of an environmental test chamber, e.g. an oven, at the beginning and end of a test period to facilitate loading and unloading the test trays. The electronic components are inserted into test trays and the trays are loaded into the oven with mating electrical connectors in the panel of the test oven. The oven door is closed and the test is conducted. Upon completion of the test, the door is opened and all trays are ejected. During insertion and ejection of each tray, reliable connection or removal of the tray from the panel mounted connectors is assured and a tray position trip sensor detects any out of position trays.

U.S. Pat. No. 5,486,982 to Hsu discloses a modularized electronic system for packaging and assembling a plurality of electronic modules for building a computer server which comprises an enclosure case having a backplane assembly, at least one electronic module assembly mounted in the enclosure case, and an external case frame for mounting the enclosure case. The enclosure case comprises one lower case assembly for module mounting. The module assembly comprises a module connector under its module head which is vertically connected to the receptacle of the backplane assembly. The rear end of the module assembly further comprises a latching means to prevent the rear end of the module assembly from moving upward. The external case frame comprises at least one case opening in its front end with a guiding means installed on both sides of the case opening and the enclosure case is slidingly mounted to the external case frame through the case opening.

A typical desk top computer system currently in use may comprise, for example, a personal computer, a monitor, a printer, and I/O devices such as a keyboard and mouse. The personal computer itself includes a housing within which are mounted a mother board containing suitable computer chip devices including a central processing unit (CPU) and memory and a plurality of daughter boards which connect to the mother board and provide additional capability such as a modem/fax board and a graphics board. Additionally, the personal computer contains a hard drive, one or more floppy drives (sized typically 5¼ inch and 3½ inch), and a CD-ROM drive and suitable control devices on the daughter boards for the operation of such media operators. Each I/O unit of the computer system is given an address and each information location in memory is given an address. To locate specific information in memory, a digital code—the address of the information—is sent on an address bus to memory by the CPU. At the same time, other digital codes representing control signals are sent on a control bus to tell the memory what to do—either to read or write information from the memory location designated by the address on the address bus. The information coming to the CPU from the memory when the memory is read, or going to the memory from the CPU to be written into memory, is also in digital codes and travels along a data bus. This description just presented for memory also applies to any I/O unit.

Whenever it becomes necessary or desirable to add a component to the system, to replace a component, or to make any other changes to the system, it is necessary to open the housing for the personal computer and with utmost care remove and replace existing components and boards and the like and with the same utmost care insert the new or replacement components and boards. However, this must only be done after carefully assuring the compatibility of all of the components. Without assurance of such compatibility, the revised system may not be operable at best, or may be seriously harmed, at worst.

It was in light of the foregoing that the present invention was conceived and has now been reduced to practice.

SUMMARY OF THE INVENTION

The present invention relates to an object-oriented modular electronic component system which comprises a plurality of self-contained operating modules, each having external mechanical and electromagnetic interconnecting devices. It includes one or more user function modules for performing specific functions, a database module for identifying the presence, location, and function of each of the operating modules of the system, a communications module for transmitting digital electronic messages among the operating modules, a power supply module for providing electrical power to the operating modules, and a power bus device for delivering power from the power supply module to the operating modules. The communications module, the power supply module, the database module, and the user function modules are all capable of being selectively operatively releasably connected, mechanically and electromagnetically. The modules are all electromagnetically disconnected in an inoperative mode and are electromagnetically connected in an operative mode. With this arrangement, operation of the modular object-oriented electronic component system may be achieved without accessing the interior of any of the operating modules. A self-contained power bus module has external mechanical and electromagnetic interconnecting devices for proper interconnection with the power supply module and with each of the user function modules. The communications module is responsive to the presence of each of the other operating modules, when in the operative mode, to determine the parameters necessary for transmitting the digital electronic messages among all of the modules. A specialization module may be provided for transmitting non-digital and trigger pulse type electrical signals among the user function modules.

The present invention, then, provides true modularity and enjoys the following features:

all components are enclosed and mutually connectable;

an extra type of module may be provided for specialized applications such as instrumentation and consumer electronics;

the circuitry necessary to drive signals through space from one module to another has been moved from the user modules of conventional systems to the module containing the physical medium through which the signals travel;

the interface standard for the signal lines is based on "I have a message of such and such a length to go to such and such a place" as opposed to "I want the bus";

the interface standard is changeable in software;

the addresses are assigned to connection ports or slots, rather than to some conceptual memory space;

systems utilizing the system of the invention may have multiple simultaneous connections between modules with different data going across each separate connection;

a multi-stage power and communications negotiation is performed during boot-up that allows the system of the invention to verify the interoperability of the modules, and to possibly boot "around" those modules that are incompatible;

depending upon the particular modules to be installed by a user, the system of the invention has the ability to completely control the aspects of power distribution—that is, assigning voltages dynamically to the power pins, cutting off power to a particular module or group of modules, "hot" insertion and removal of modules, registering for important power events for battery backed power supplies (10 minutes until power reserves gone, five minutes, and the like); and the system of the invention has a "hardware" database with a known location that modules use to locate each other.

The system of the invention utilizes enclosed or self-contained modules and open-air physical interfacing of the modules which facilitates the initial installation and subsequent addition and replacement of the modules. Current VME (Versa Module Eurocard) style systems usually leave the circuit board exposed, forcing the user to handle and store the board carefully. Personal computer systems have the same flaw, plus the need to open a housing in order to add or change boards. Also, with personal computers, disk drives are usually connected to the rest of the system via cables. The system of the invention avoids all of these difficulties. Modules are enclosed for casual handling, and there is no enclosing housing to open and close. If a module is to be added, the user merely picks it up and plugs it in. If a user wishes to remove a module, he merely grasps it and unplugs it. Disk drives are plugged in and unplugged just like any other module. Also, the specialization module provided by the invention reduces the need for cables extending between the personal computer and home electronics like VCRs, CD players, AM/FM tuners, and the like.

There are many benefits and features of the present invention. The more important ones will be enumerated.

(a) The enclosed module design and open-air physical interfacing of modules, as provided by the invention, allows all modules direct access to the transfer path. Currently, external devices like disk drives are connected to some type of bus like a SCSI (Small Computer System Interface), for example. The direct access provided by the invention allows for faster and parallel access of information.

(b) Again, the enclosed module design and open-air physical interfacing of modules, as provided by the invention, facilitates tailoring of the system to the user's needs. Enclosed computer systems only allocate a certain amount of space for disk drives and a certain number of slots for expansion boards, and the two are not interchangeable. The backplane in both enclosed personal computer systems and VME-style systems is a single signal path and is generally physically difficult to replace. In contrast, the system of the invention does not distinguish between disk drives and other modules. If one user desires four hard drives, two CD drives, and three floppy drives (one 5¼ inch and two 3½ inch), he need only plug that configuration together. In another scenario, he might have three IBM CPU modules to run IBM software in true parallel. If the user finds that he doesn't have sufficient communications bandwidth between the modules for his purposes, he can replace the current communications module with a suitable replacement module.

(c) The present invention changes the philosophy of the transfer mechanism from "I need to control the bus" to "I have a message of a certain length that has to go to a certain place". This change allows for multiple transfer paths. A portion of the current emphasis on the need for wider buses and faster transfer rates comes not from the need to transfer a large amount of data from one specific place to another, but from the need to transfer some amount of data from several places to several other places. Consider a multiprocessing system that could perform the following activities at the same time: print a document, back up a disk to tape, and allow work to proceed with a favorite drawing program. If there is only one transfer path such as with a bus, then the time spent on the bus for each activity needs to be shortened in order for the system as a whole to be perceived as being faster. This involves widening the data path and increasing the clock rate, and installing new components that can take advantage of these changes. The old hardware is incapable of using the new data lines or the faster clocking speed. The system of the invention, however, allows one to address the problem directly: adding data paths gives each activity its own bus, and the system as a whole speeds up, even with the old hardware. The configuration of the transfer paths can even be optimized to a particular computing need. For example, systems are presently in use in which data flows into one board, is processed, is passed to another board, is processed, and so on. A good communications object for this kind of environment would be one with a few general paths for any-module to any-other-module transfers, and a direct path from the output of one module to the input of the next. Then the transfers that are to flow from one module to the next in a processing chain can all occur simultaneously.

(d) Changing the philosophy of the transfer mechanism from "I need to control the bus" to "I have a message of a certain length that has to go to a certain place" allows for more sophisticated, efficient and flexible scheduling of the transfer of data around the system. Current schemes allocate the one transfer resource, without regard to where the data is going to go or how much is to be transferred. The present system deals with the goal (which is the data transfer), instead of the method (which is bus acquisition). In the inventive system, the interface is also changeable in software at the message level. Messages in systems of the prior art are tied directly to their pins, so any changes invalidate hardware designed to the previous standard.

(e) According to the invention, the user module, database module, and power supply module are isolated from the physical driver requirements of the message transfer path such that the sending module can communicate with another module that is inches away or several feet away. The extra voltage and current (or even conversion to light) is hidden.

(f) The invention supports the use of a specialization module which allows the intermingling of computer components with audiovisual components such as tape players, VCRs, television and radio tuners, and the like. For example, the output from a television tuner (the input to which has come from the specialization module) might be passed through an encryption program operating on a CPU module before routing it to the VCR module. In this manner, the user can maintain the security of the incoming message.

(g) The ability to segment the power bus allows multiple voltage configurations on the power port pins. This allows a system to use modules that ordinarily would conflict with each other (one module that requires +5 and 0 on power pins 1 & 2, and another module that requires +12 and –12 on the same pins).

(h) The ability to cut off power to an individual slot or a section of slots allows the user to remove and insert modules while the rest of the system is active. While some current systems allow for hot insertion, the module needs to be specially designed so that damage to the module does not occur, and so that the functioning of the bus is not interfered with during the insertion. The system of the invention simply deactivates the power lines (and communication lines, if necessary). The user can then plug and unplug any module, without having to use modules specially designed for the purpose.

(i) The multi-stage power up process of the invention allows the system to verify the appropriateness of each module in the system without damaging that module. Depending on the capabilities of the power bus module, the system might even be able to isolate an incompatible module. This would allow the rest of the system to boot completely. If the power bus is unable to isolate a module that would be damaged by the voltages used to power the other modules (or one that demands more power than the power modules can provide), the system would refuse to come up and would use lights to indicate the offending module(s).

(j) Isolating the user module from the media forming the transfer path allows the communications module to shut out misbehaving user modules. Traditional buses fail if a board puts spurious signals onto the bus.

(k) Associating addresses with physical connection slots rather than a conceptual memory space eliminates address conflicts and makes it much easier to address a piece of hardware without knowing much about the configuration of the system.

(l) The database module allows the hardware modules to locate each other and know what services are available. With sufficiently sophisticated user modules, parts of a system can be functional without the need for a centralized operating system.

(m) The object-oriented message-based nature of the system as a whole, combined with the presence of the database module that allows objects to locate and communicate with each other, allows several "operating environments" to be active at once. For example, simultaneously, there could be:

three processor modules running independent UNIX operating systems;

three more processor modules running a single UNIX operating system that is performing load balancing among the three processors;

two modules running independent copies of DOS; and four modules running MacIntosh environments.

These modules might all be sharing the four monitors and three disk drives.

Accordingly, a primary object of the present invention is to provide a new and improved modular electronic component system.

Another object of the present invention is to provide such a system in which all components are enclosed modules which, when joined together mechanically and electromagnetically, provide the user with a system tailored to his or her needs.

A further object of the present invention is to provide such a system in which there is no requirement to gain entry to any module and all "handshaking" is achieved automatically.

Still another object of the invention is to provide such a system in which modules may be added or removed from the system as desired by the user.

Yet a further object of the present invention is to provide such an object-oriented modular electronic component system comprising a plurality of self-contained operating modules, each having internal electronic apparatus and external mechanical and electromagnetic devices for interconnecting the internal electronic apparatus to the internal electronic apparatus of others of the operating modules including a user module for performing a specific end function, a database module for identifying the presence, location, and function of each of the operating modules of the system, a communications module for transmitting digital electromagnetic messages among the operating modules, a power supply module for providing electrical power to the operating modules, and a power bus device for delivering power from the power supply module to the operating modules, the communications module, the power supply module, the database module, and the user module all being capable of being selectively operatively releasably connected as a unit, mechanically and electromagnetically, the modules all being electromagnetically disconnected in an inoperative mode and being electromagnetically connected in an operative mode, whereby configuration and operation of the modular object-oriented electronic component system may be achieved without accessing the internal electronic apparatus of any of the operating modules.

Yet another object of the invention is to provide a method of initializing operation of such an object-oriented modular electronic component system comprising the steps of mechanically and electrically interconnecting the power bus device and all of the operating modules, activating the power supply module, operating the power supply module to initially activate the ROM component and the microprocessor of the communications module to place the communications module in a stage one power-up condition whereat the communications module is able to negotiate communications and power requirements without being able to transmit digital electromagnetic messages among the operating nodules, operating the power supply module to transmit digital electromagnetic messages to the communications module via the control port containing information regarding the software protocol version of the control port and the characteristics of the data port of the power supply module, operating the communications module to transmit digital electromagnetic messages to the power supply module via the data port containing information regarding the power requirements of the communications module, operating the power supply module to fully activate the remainder of the internal components of the communications module to place the communications module in a stage two power-up condition whereat the communications module is able to transmit digital electromagnetic messages among the operating modules, operating the communications module to transmit digital electromagnetic messages to the power supply module via the data port containing information regarding the number and locations of the user modules and the database module, operating the power supply module to initially activate the ROM component and the microprocessor of the database module and the user modules to place the database module and the user modules in a stage one power-up condition whereat the modules are able to negotiate communications and power requirements and respond to queries from other modules without being able to perform any other operations, operating the database module and the user modules to transmit digital electromagnetic messages to the communications module via the control ports containing information regarding the software protocol version of the control ports and the characteristics of the dataports of the database module and the user modules, operating the database module and the user modules to transmit digital electromagnetic messages to the power supply module via the data ports containing information regarding the power requirements of the database module and the user modules, operating the power supply module to arrange the power bus means such that an optimal number of the user modules and the database module become operational, and operating the power supply module to fully activate the remainder of the internal components of the database module and of the user modules to place the database module and the user modules in a stage two power-up condition whereat the database module and the user modules are able to perform their respective operations.

Yet another object of the invention is to provide a method of operating such an object-oriented modular electronic component system comprising the steps of initiating an attempted transmission of a digital electromagnetic message comprising data information from the data port means of a first user module to the data port means of a second user module, transmitting a digital electromagnetic message comprising control information from the control port means of the first user module to the communications module, operating the communications module to determine the availability of a transfer path between the data port means of the first user module and the data port means of the second user module, operating the communications module to determine the availability of the first user module and of the second user module, operating the communications module to connect the transfer path from the data port means of the first user module to the data port means of the second user module, transmitting a digital electromagnetic message comprising control information from the communications module to the control port means of the second user module, transmitting a digital electromagnetic message comprising control information from the communications module to the control port means of the first user module, and transmitting the digital electromagnetic message comprising data information from the data port means of the first user module to the data port means of the second user module.

Yet a further object of the invention is to provide a method of operating such an object-oriented modular electronic component system comprising the steps of connecting a user module to the communications module, transmitting from the control port means of the user module to the communications module a digital electromagnetic message comprising control protocol version information defining the control message formats which are characteristic of operation of the control port means of the user module, operating the communications module to determine whether digital electromagnetic messages from the control port means of the user module can be interpreted by the communications module, and operating an indicator in the event of a determination that digital electromagnetic messages from the control port means of the user module cannot be interpreted by the communications module.

Still a further object of the invention is to provide a method of initializing operation of an object-oriented modular electronic component comprising the steps of operating the power supply module to initially activate the ROM component and the microprocessor of the database module and the user modules to place the database module and the user modules in a stage one power-up condition whereat the modules are able to negotiate communications and power requirements and respond to queries from other modules without being able to perform any other operations and operating the power supply module to fully activate the remainder of the internal components of the database module and of the user modules to place the database module and the user modules in a stage two power-up condition whereat the database module and the user modules are able to perform their respective operations.

Other and further features, advantages, and benefits of the invention will become apparent in the following description taken in conjunction with the following drawings. It is to be understood that the foregoing general description and the following detailed description are exemplary and explanatory but are not to be restrictive of the invention.

The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENT

Figure 1A:
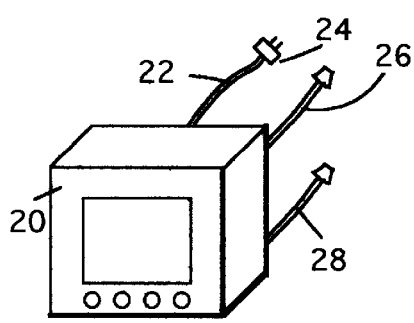
FIGS. 1A, 1B, and 1C are diagrammatic perspective views, respectively, of conventional electronic components representative of the prior art.
Figure 1B:
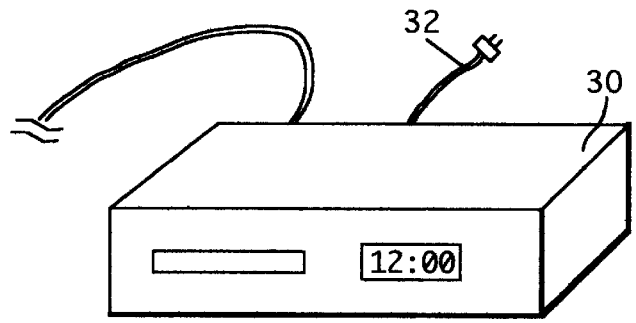
Figure 1C:
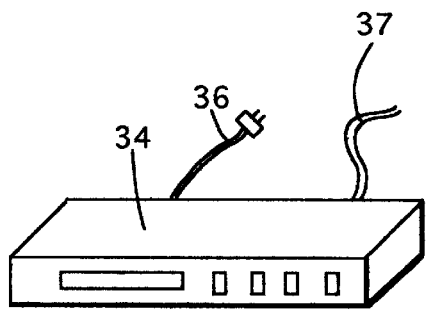

The present invention relates to an object-oriented modular electronic component system which employs an architecture which can accommodate consumer electronic systems as well as computers. The line between consumer electronics and computers is blurring just as the line between mainframes, minicomputers, work stations, and PCs already has. Consumer electronic equipment usually takes the form of completely enclosed units, not usually internally expandable, with individual power cords. See, for example, FIG. 1A which illustrates a typical television set 20 with an associated power cord 22 and terminal plug 24. The television set 20 may also include an antenna lead 26 and one or more accessory leads 28 for electrically connecting to one or more electronic components such as, for example, a VCR 30 (FIG. 1B) and associated power cord 32. Another example of electronic component is a CD player 34 shown in FIG. 1C which includes a power cord 36 and an accessory lead 37. Numerous other components are possible such as amplifiers, AM/FM tuners, cassette players, speakers, and the like.

Figure 2:
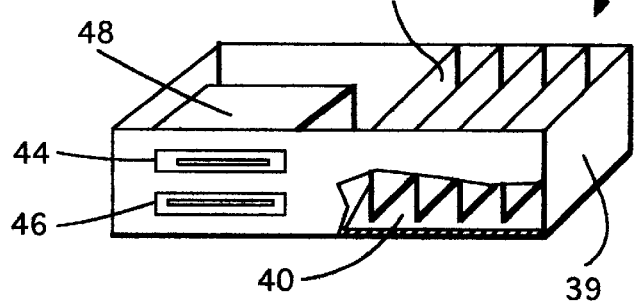
FIG. 2 is a diagrammatic perspective view, certain parts being cut away for illustration, of a known Personal Computer (PC) system.
Figure 3:
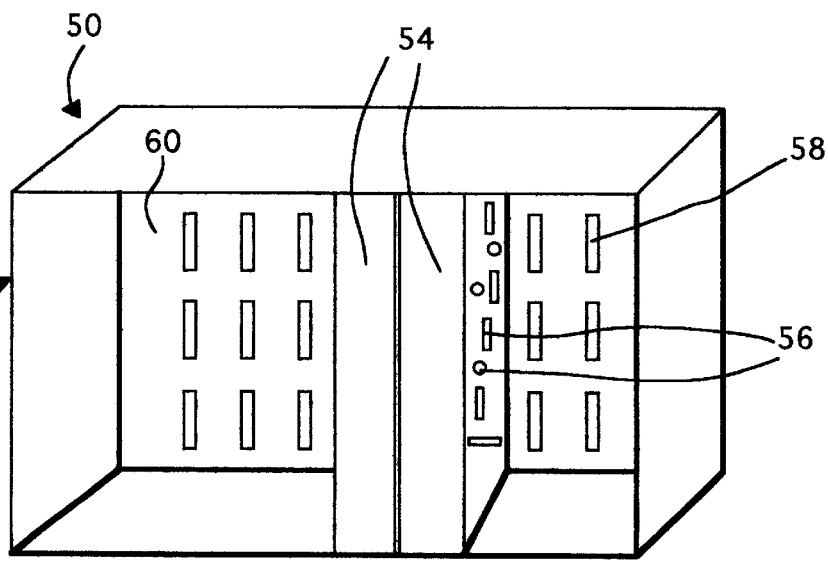
FIG. 3 is a diagrammatic perspective view of a known Versa Module Eurocard (VME) system.

The mechanical layout of computer systems tends to take two different general configurations as illustrated in FIGS. 2 and 3, respectively. In FIG. 2 is illustrated the personal computer (PC) configuration indicated by a reference numeral 38. An enclosed case 39 shown with top removed supports a mother board 40 with internal slots for mounting a plurality of daughter boards 42 to the mother board and assigned spaces for a fixed number of floppy drives 44, 46, and an internal hard drive 48. A VME chassis 50 is illustrated in FIG. 3 which includes a housing 52, or open card cage, for supporting a plurality of VME cards 54 containing a variety of electronic devices 56 comprising operative circuitry. The VME cards 54 suitably engage with connectors 58 in a backplane 60. Therefore, in either configuration, normally exposed circuit boards are inserted into slots in a fixed backplane.

Figure 4:
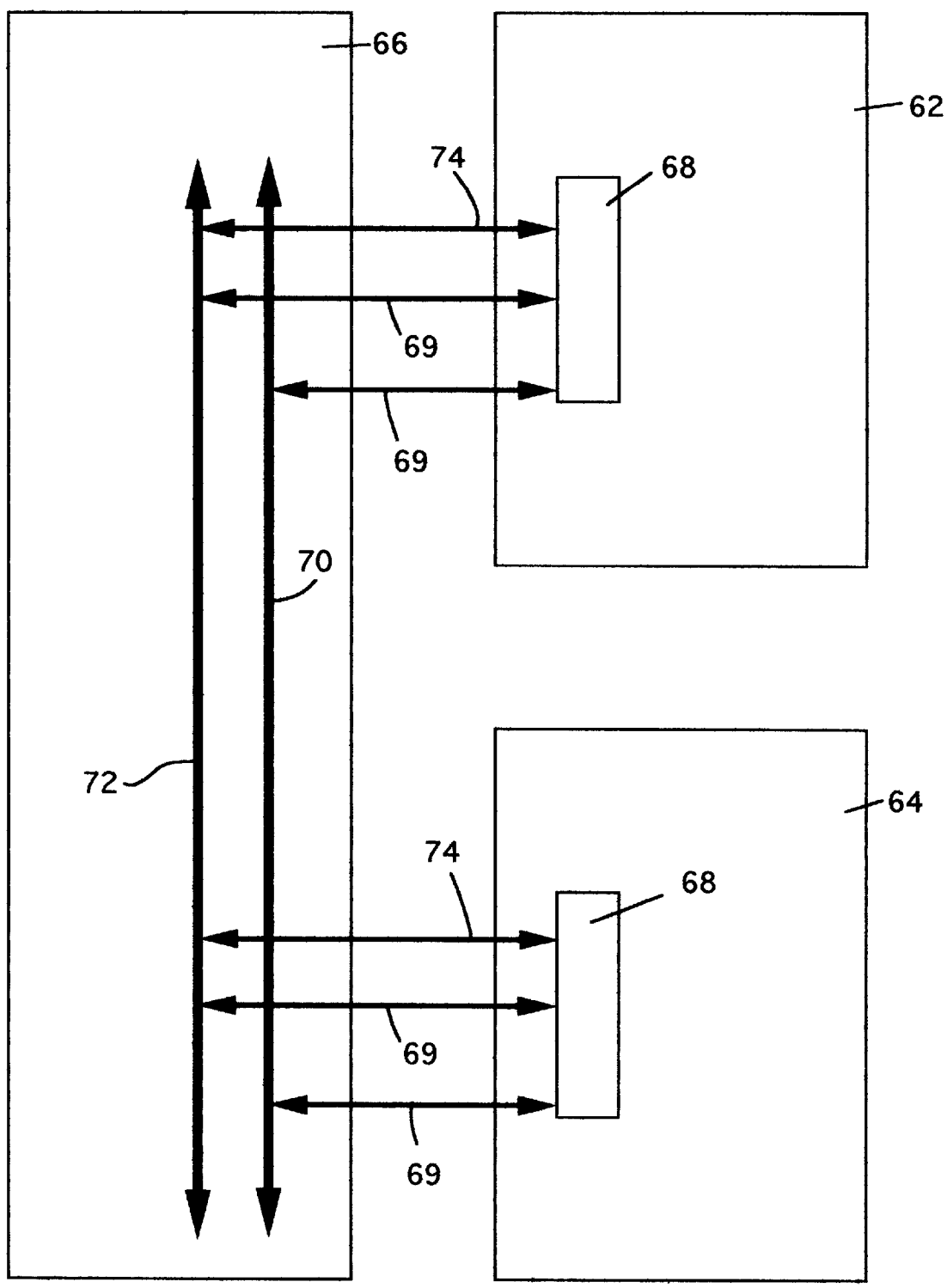
FIG. 4 is a schematic prior art representation illustrating the datapath between a pair of user boards and the power distribution path for energizing the user boards.

The internal electrical apparatus for consumer electronic systems is generally proprietary. Standards exist for the connectors that can be cabled together, but commonality pretty much ends there. The electrical apparatus for computer architectures of interest, for purposes of the present invention, viewing FIG. 4, is the interface between a particular user board 62 and the data path used to connect to another user board 64, and the power system as represented by the element 66. The element 66 may be, alternatively, a PC mother board or a VME backplane. As shown in FIG. 4, user boards 62, 64 for computers contain their own driver chips 68 which are used to drive signals via data paths 69 onto a set of copper traces 70, 72 on the mother board or backplane 66. The copper trace 70 may be, for example, an address and data bus while the copper trace 72 may be an arbitration bus. Designers of such user boards must use chips with sufficient electrical energy for the length of the copper traces 70, 72 on the backplane or mother board. All other user boards in the system see the signals on the bus at the same time, and provisions for data paths are an explicit part of the bus specification. Power for the user boards may be provided using connections 74 from the bus traces.

Figure 5:
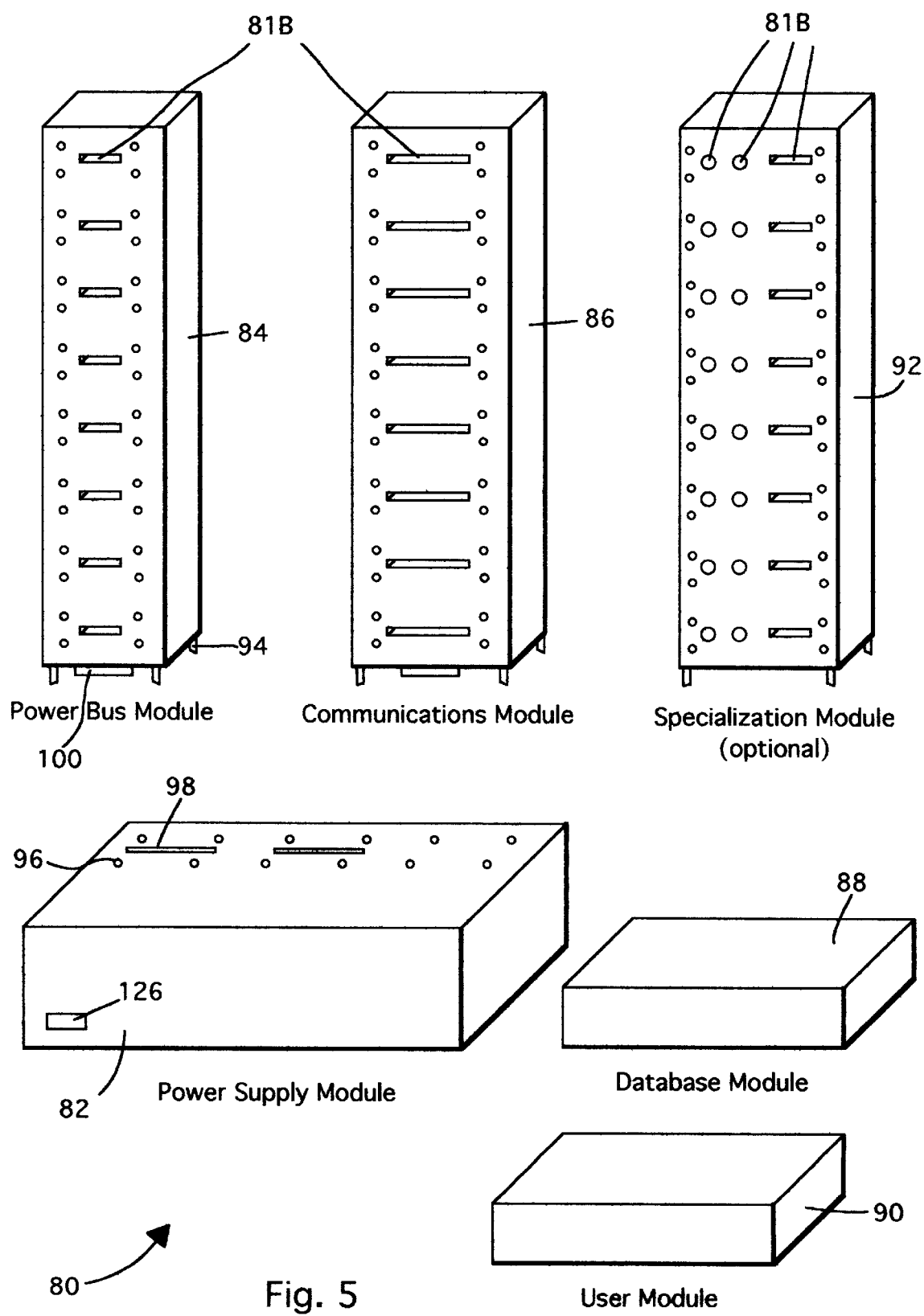
FIG. 5 is an exploded perspective view of an object-oriented modular electronic component system embodying the invention.

Turn now to FIG. 5 for an initial description of the object-oriented modular electronic component system 80 of the invention. All components are enclosed modules that are plugged together to create a system that performs the desired functions. This includes a power supply module 82, a power bus module 84, a communications module 86, a database module 88, a user module 90, and an optional specialization module 92. The communications module, the power bus module, and the optional specialization module may be considered, in broad terms, to take the place of the backplane 60 of the VME chassis 50.

Figure 6:
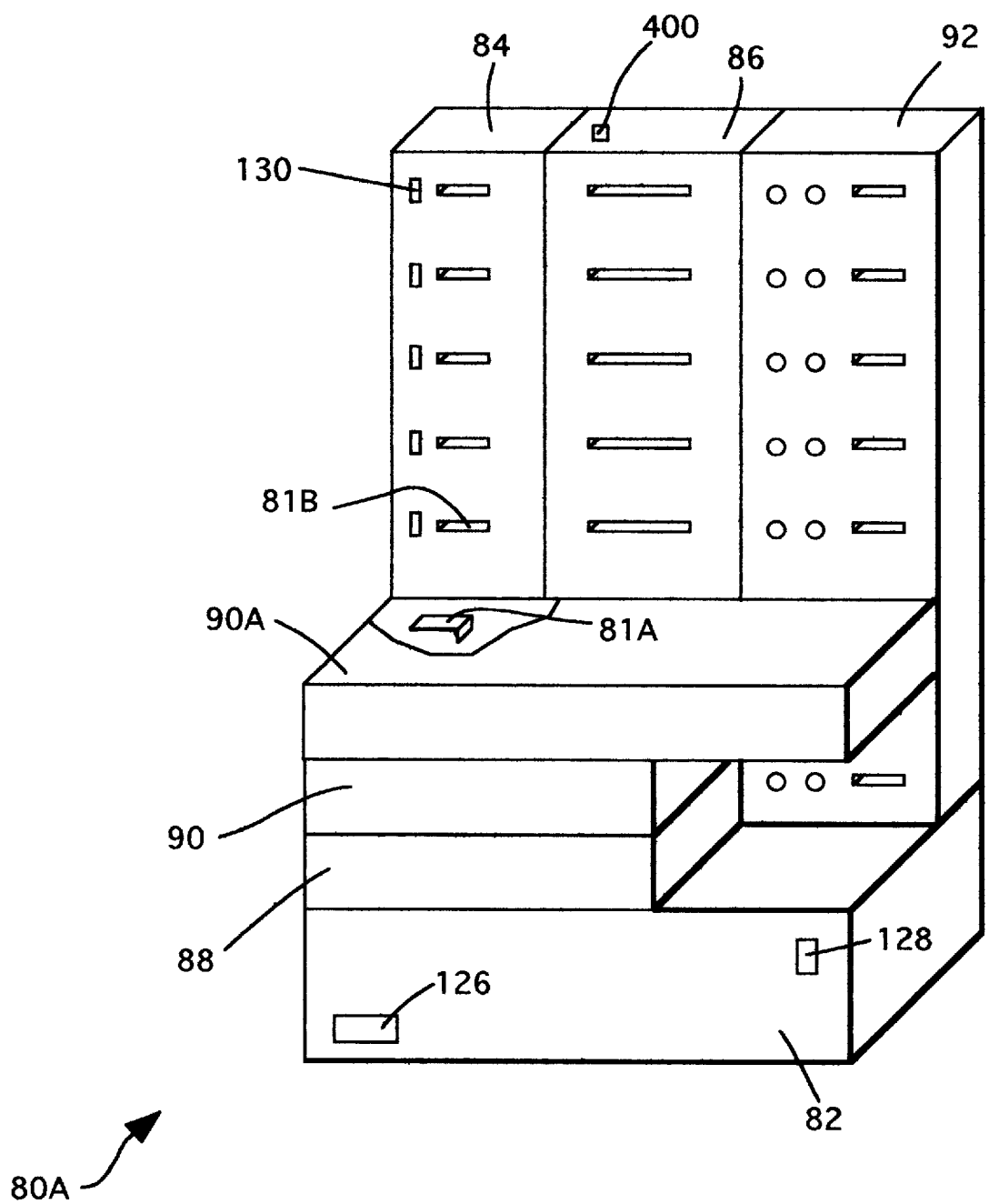
FIGS. 6, 7, 8, and 9 are all diagrammatic perspective views of different possible configurations, according to the invention, of the components illustrated in FIG. 5.

One possible configuration of the components illustrated in FIG. 5 is illustrated in FIG. 6 and indicated by reference numeral 80A. Each module includes suitable male devices 81A (such as plugs, pins, and the like) and female devices 81B (such as slots, sockets, and the like) for mechanically joining with appropriate ones of the other modules. The particular construction of these devices is not part of the present invention although their availability in some form is critical to the invention. Viewing FIG. 5, for example, the power bus module 84 is provided with a plurality of depending mounting pegs 94 which match up with similarly sized and spaced mounting bores 96. The mounting pegs 94 may be fittingly received in their associated bores 96 or, if they are freely joined together, some manner of mutual locking and unlocking must be provided to assure that the power bus module 84 is securely mounted on the power supply module 82 while enabling their easy separation whenever desired. In a similar manner, the power supply module 82 is provided with a female connector 98 positioned to receive a mating male connector 100 projecting from the base of the power bus module. In FIG. 6, the power bus module 84 is operatively joined to the power supply module.

What has just been described for interconnecting the power supply module and the power bus module applies for all of the other modules of the system of the invention. While the system may use a cabinet to house all of the components or some sort of exoskeleton for support of the components, such a construction is not necessary. Indeed, it is considered to be a positive feature of the invention that the components can stand alone and be added and subtracted as desired.

It will be appreciated, as seen in FIG. 6, that while the power bus module 84, the communications module 86, and the optional specialization module 92 all connect to the power supply module 82, they do not connect to each other. Further, while the database module 88 and the user module or modules 90 connect to the power bus module 84, the communications module 86, and the optional specialization module 92, they do not connect to the power supply module 82 or to each other. The reason for this will become more apparent with the continued description of the invention. In the system 80A illustrated in FIG. 6, by way of example, an upper user module 90A is connected to the specialization module. The module 90A may be a videotape drive mechanism plugged into a consumer electronics component, a data acquisition module plugged into an instrumentation module, or the like. It will also be appreciated that a strictly digital computer system may not need the specialization module.

Figure 7:
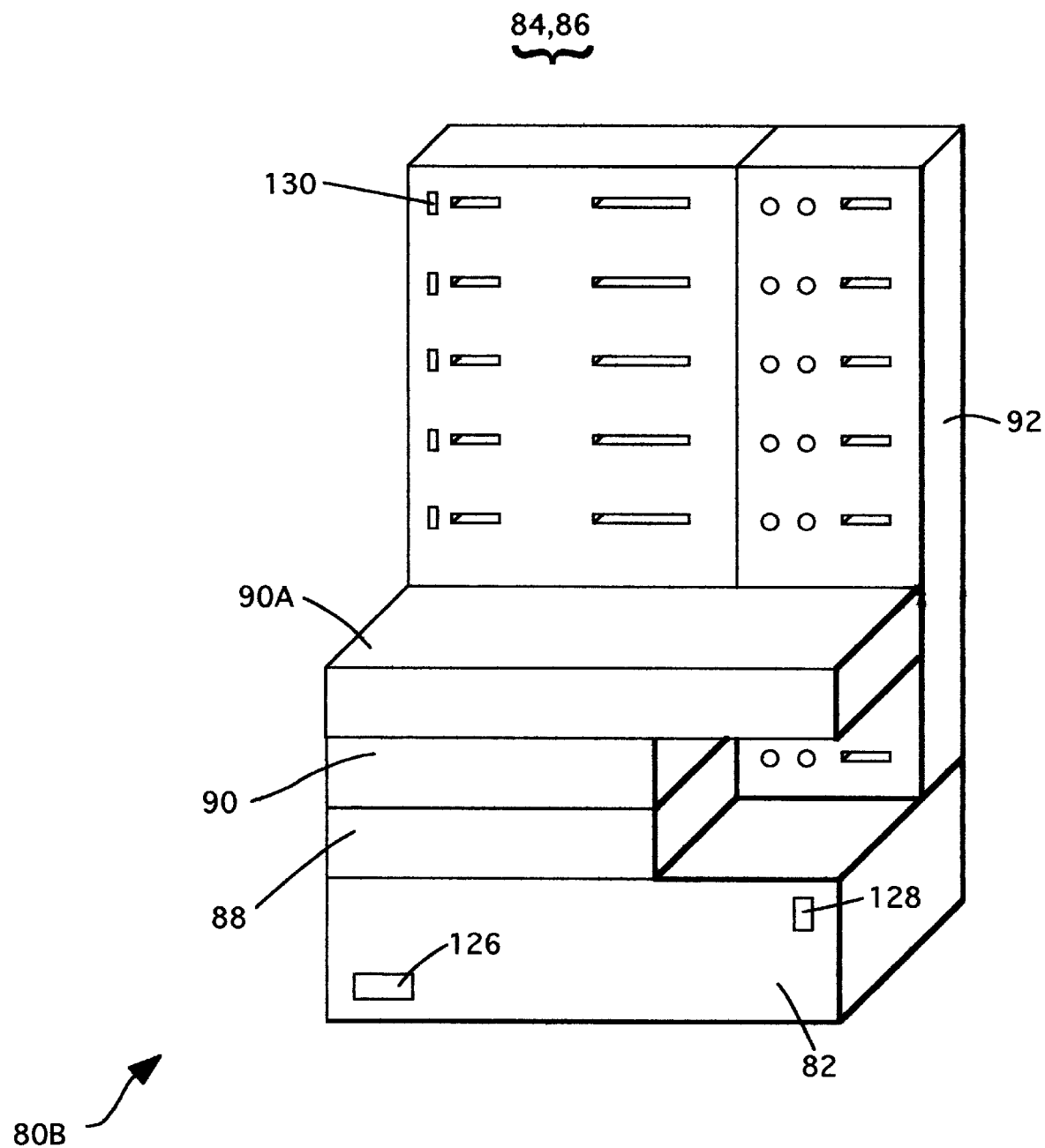

Another possible configuration of the components illustrated in FIG. 5 is illustrated in FIG. 7 and indicated by reference numeral 80B. In this instance, the power bus module 84 and the communications module 86 are provided as a single unit.

Figure 8:
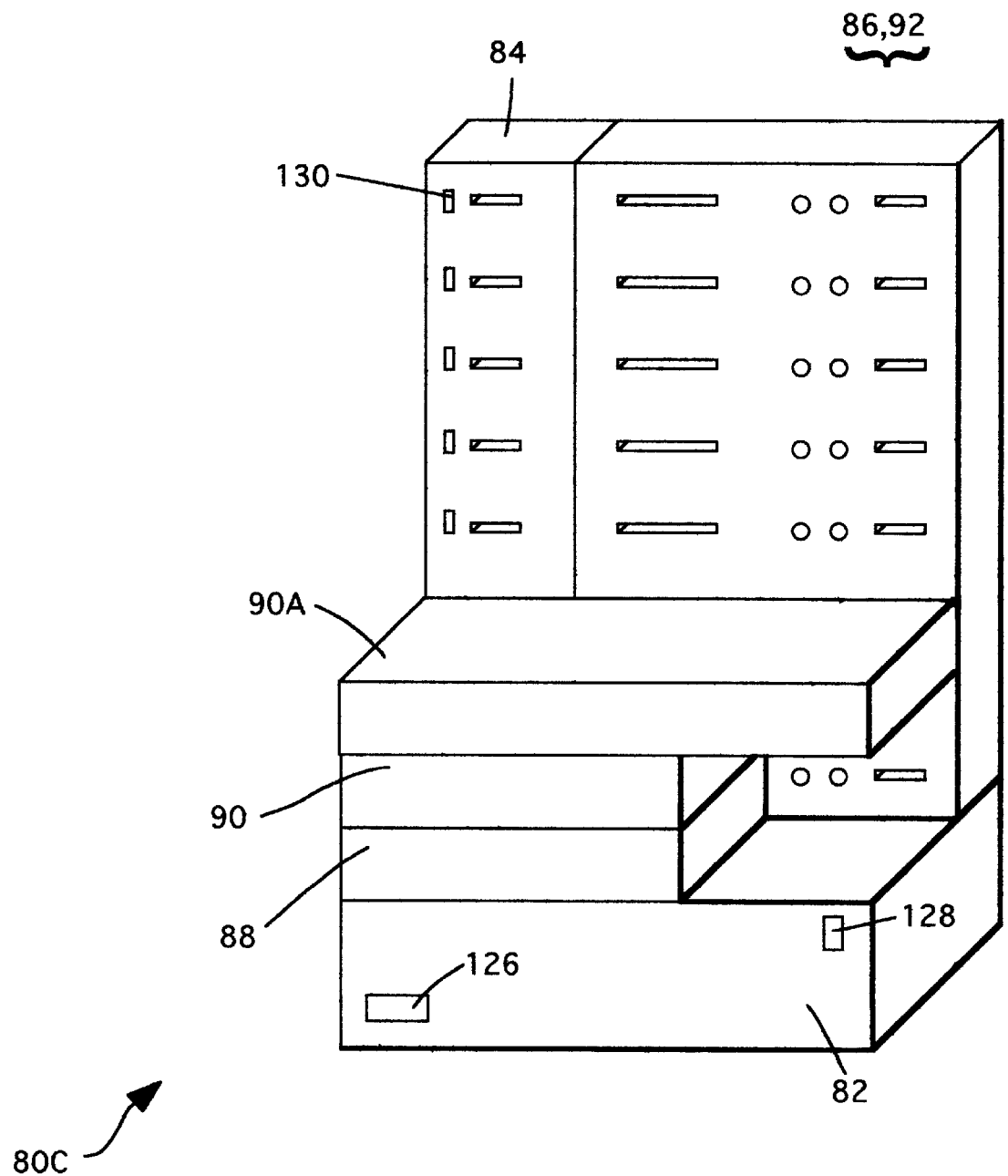

Still another possible configuration of the components illustrated in FIG. 5 is illustrated in FIG. 8 and indicated by reference numeral 80C. In this instance, the communications module 86 and the specialization module 92 are provided as a single unit.

Figure 9:
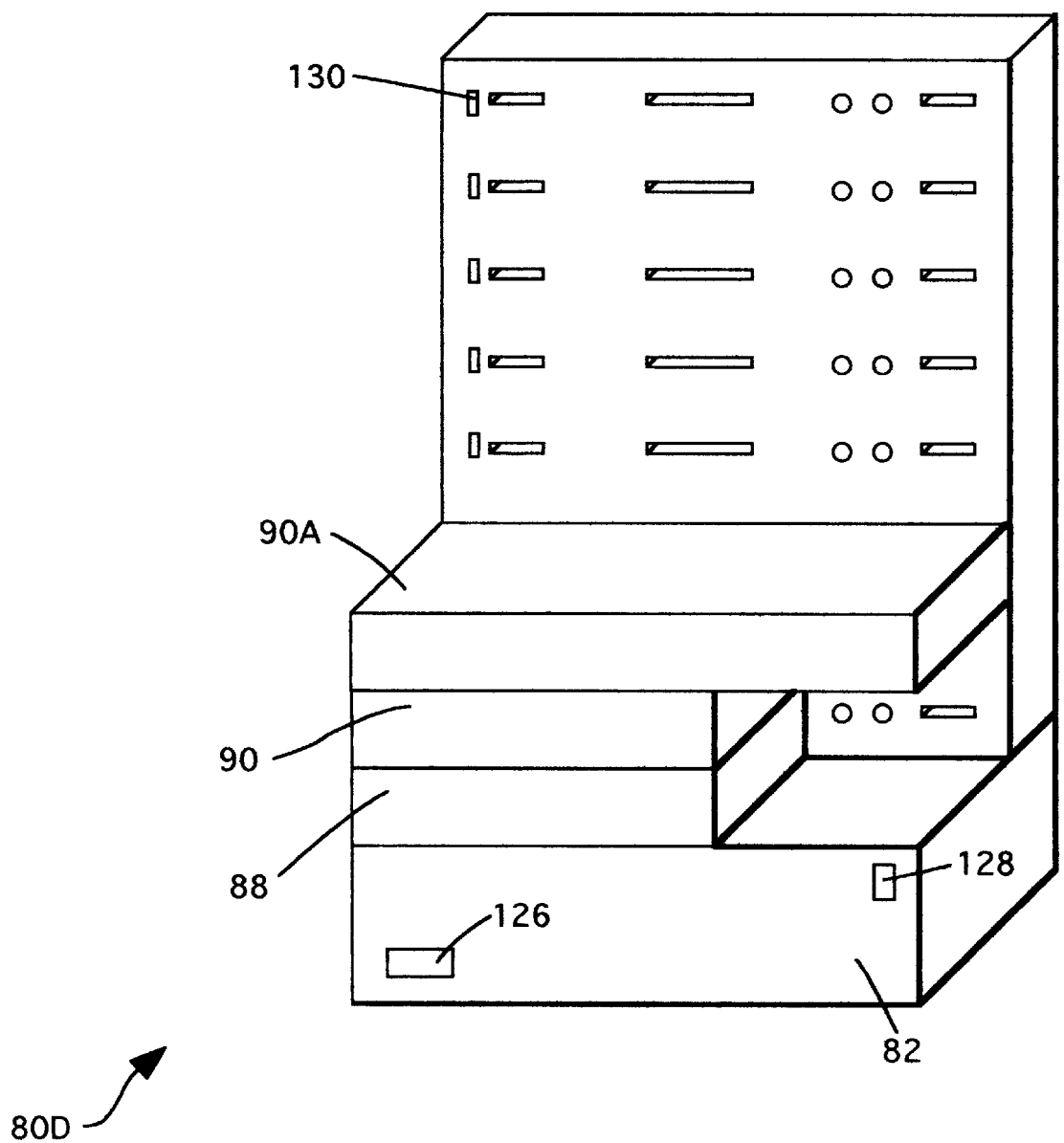

Yet another possible configuration of the components illustrated in FIG. 5 is illustrated in FIG. 9 and indicated by reference numeral 80D. In this instance, the power bus module 84, the communications module 86, and the specialization module 92 are all provided as a single unit.

The "machine concept" for a PC is whatever is contained in the enclosure of the component. The open architecture described above allows for scalability. Communications modules with more ports can be designed or several communications modules could be connected by wire or fiber cables. However, such an arrangement would not be considered to be a network.

PCs are centered around a single microprocessor that does much of the work. There are some multiple processor work stations in existence. The concept of the system of the invention, however, allows for a large number of any type of processor. The same concept applies also for disk drives and tape drives. In PCs, physical space is allotted for one or two of these devices, and then they are often still placed on a bus such as a SCSI. In contrast, the new system allows for a large number of such devices, and these devices have the same direct access to the communication technology as the processors. In fact, all of the user modules of the system 80 have direct access to the communication technology.

Figure 11A:
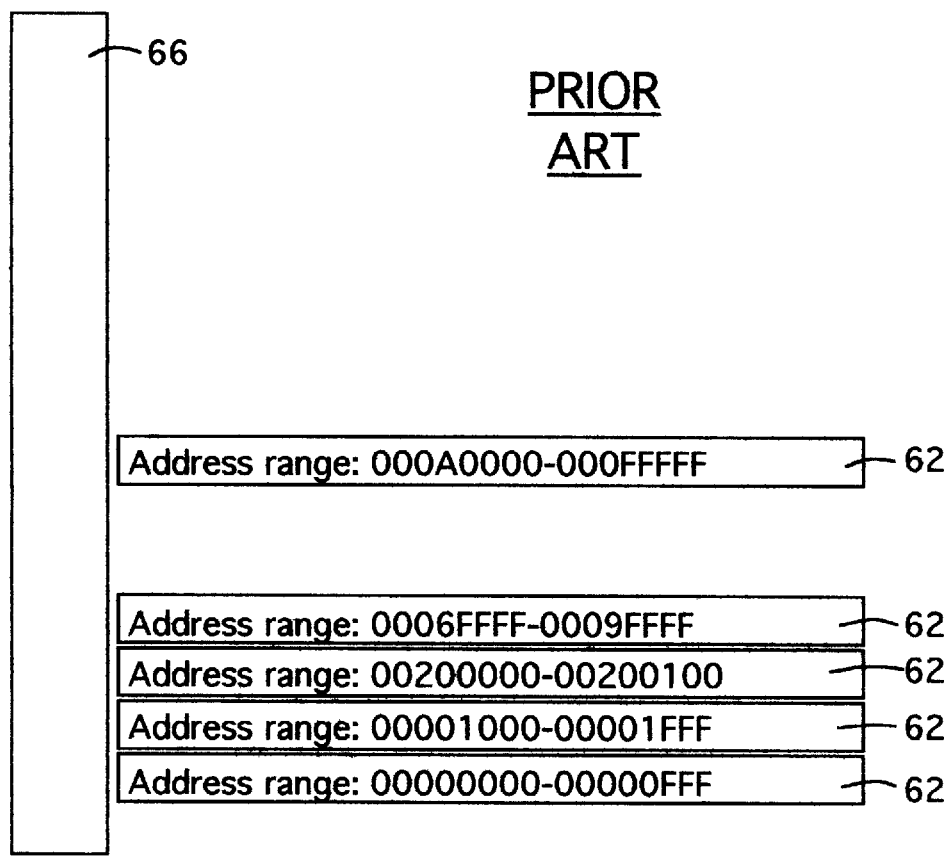
FIG. 11A is a schematic prior art representation illustrating the address space allocations among circuit boards in a conventional computer system.
Figure 11B:
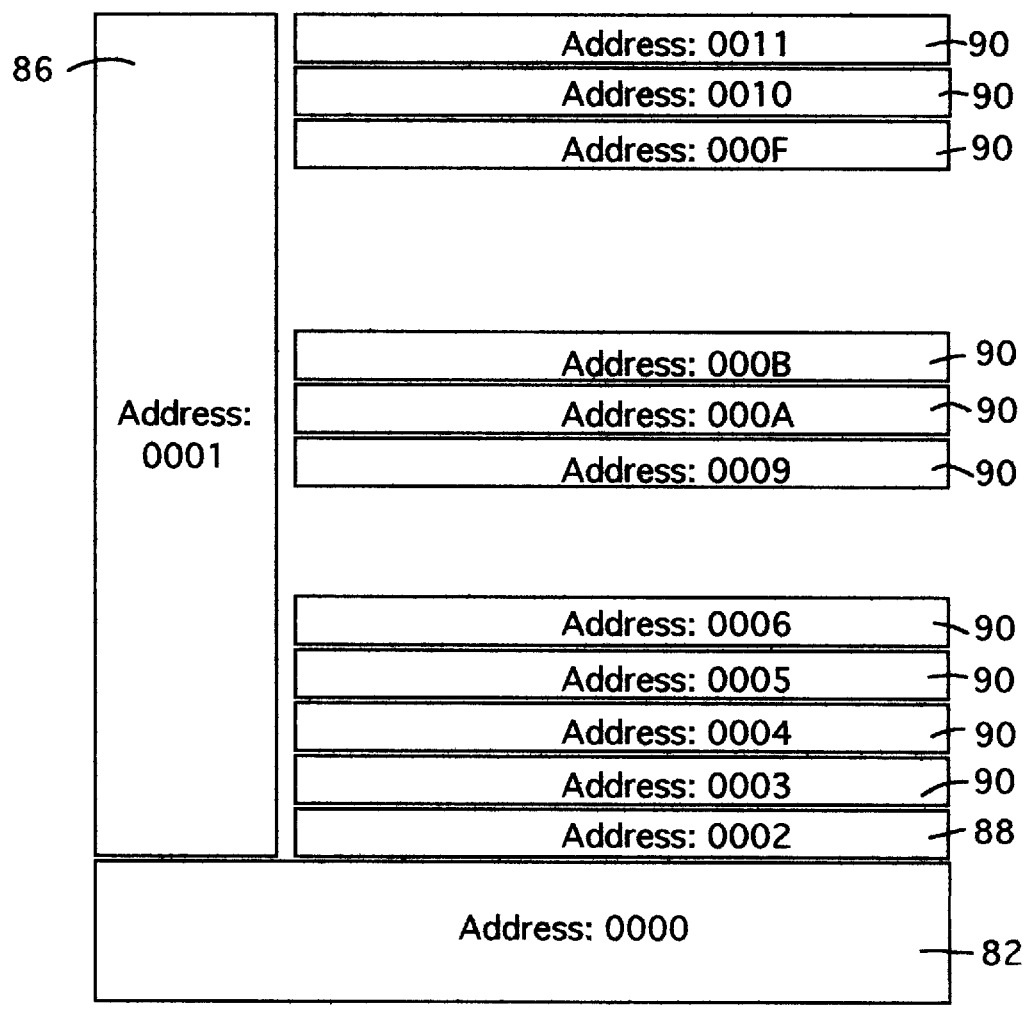
FIG. 11B is a schematic representation illustrating the address space allocations among some modules in the system of the invention.
Figure 11C:
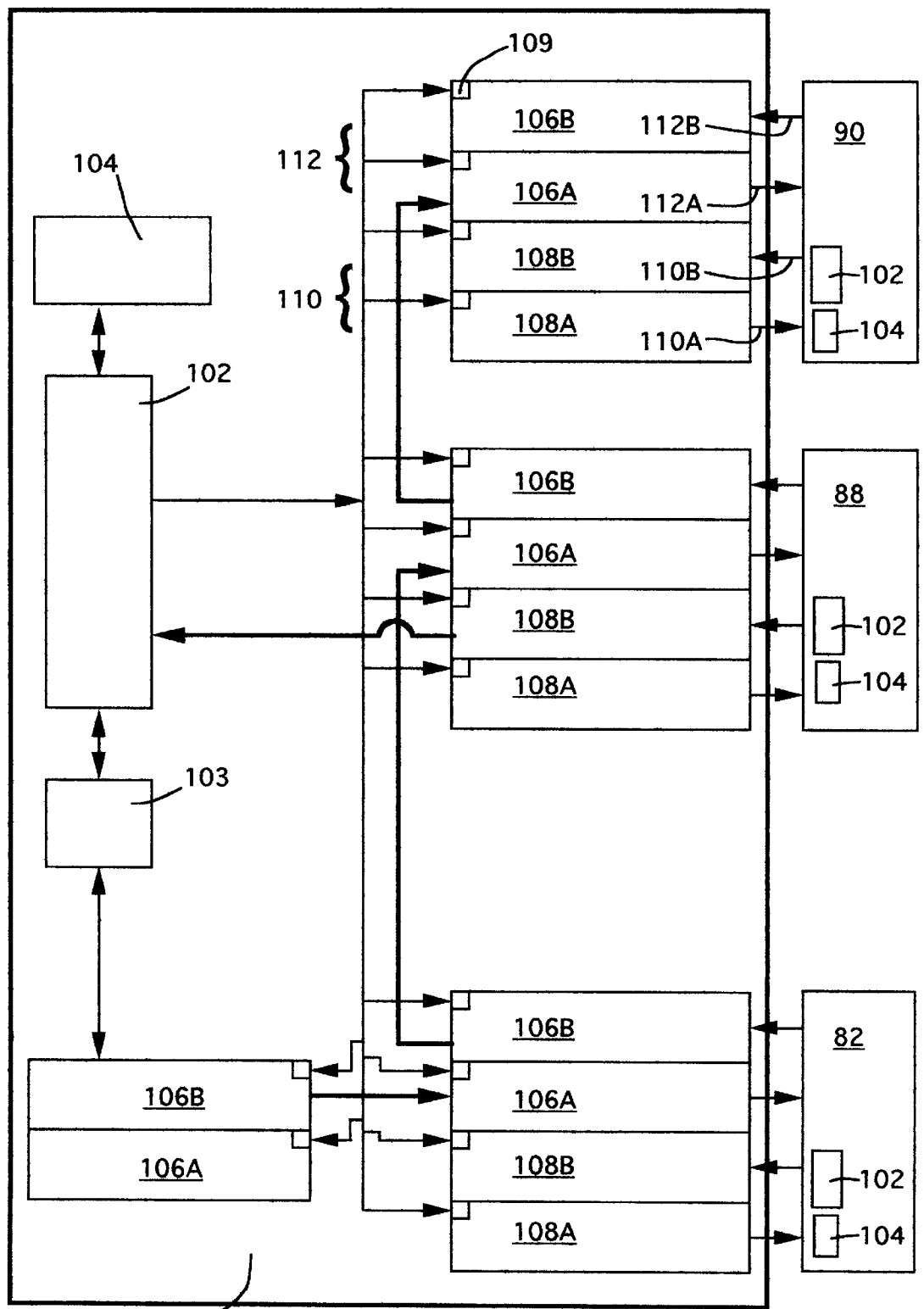
FIG. 11C is a schematic representation illustrating the electromagnetic interface of some of the components illustrated in FIG. 5.

The modularity of the object-oriented modular electronic component system 80 has been presented. Consider now what the term "object-oriented" means as it applies to the system of the invention. In the traditional software paradigm there exist variables, and command statements to act upon those variables. Any command statements can modify almost any variables (subject to some limited forms of scope control). This paradigm often makes access control over variables, and the debugging of programs, difficult. The object-oriented software paradigm was created to address these issues. In the object-oriented paradigm, the variables and the command statements that act on them are combined in a single construct called an "object". The variables of an object are called "attributes", and the command statements that act on them are called "methods". The attributes of an object may only be accessed via the methods. An outside entity cannot use independent command statements to access the attributes of an object. The modules in the system of the invention may also be considered "objects". As illustrated in FIG. 11C, each operating module 82, 86, 88, and 90 contains a microprocessor device or central processing unit (CPU) 102 that will enable it to respond to requests from other modules. These requests will be the "methods" for the modules. Each operating module 82, 86, 88, and 90 also contains information in a read only memory (ROM) 104 describing features of the module such as the module type, capabilities, manufacturer, power requirements, data port characteristics, and the like. The information that describes the module type, capabilities, manufacturer, power requirements, data port characteristics, and similar characteristics of a module is the "personality" of the module. The ROM 104 containing that information is the "personality" ROM.

User modules can take a variety of forms. One particularly vital form is a disk drive module (not shown). Conventional disk drives are controlled by a driver operating on the system CPU in PCs. The minimal adaptation necessary for purposes of the system of the invention would be adding a CPU and "personality" ROM to handle messages. The module would be able to identify itself as a disk drive, whether or not its media was ejectable, whether or not there is a disk inserted in the case where the media is ejectable, size of the storage available on the physical disk, and other pertinent information. A driver could still run on another module and use the basic commands (seek, read, write, eject) to control the disk, but would not thereby utilize to full advantage the benefits of the present system, however. Controlling the disk driver from another location is a waste of system communication bandwidth and does not fully encapsulate the functions of a file system. The disk drive module should have its own RAM along with the ROM and the CPU. File systems for the various environments would operate on the CPU. For instance, a hard disk might have a UNIX partition, an IBM partition, and a MacIntosh partition. The module containing that disk would be operating a UNIX file system driver, an IBM file system driver, and a MacIntosh file system driver. These drivers would make calls to a lower-level facility that would actually handle the accessing of the disk. This design simplifies traffic across the communications module to the higher level functions like "open a file", "create a new file", and the like. Now, this disk drive CPU does not have to be a high powered computer chip. That kind of capability is not necessary for operating a file system.

Another important user module may take the form of a keyboard and mouse module (not shown). While there is no requirement for these two devices to be grouped together, the prevalence of graphical user interfaces makes it a natural combination. As in the instance of the disk drive module, it would be preferred that the keyboard and mouse module would not incorporate only a controller having the minimum intelligence necessary, thus forcing some "device driver" from another module to handle other operations. Instead, it is preferred that the keyboard and mouse module would take requests to watch for the occurrence of particular events, such as key presses, mouse clicks in a certain region, and the like. The controller would monitor the keyboard and mouse, and if the events occurred, would notify the appropriate entity. The mouse controller would send messages to a graphics module whenever the mouse was moved in order to move the cursor. However, if a mouse button was clicked while the cursor was in an area that has no need to know about mouse clicks, no message would be generated.

Still another user module might take the form of a program module (not shown). In conventional PCs, the CPU is a rather central part of the system design and usually resides on the motherboard (or at least resides on a daughtercard on the motherboard). In the system of the invention, a program module is one that operates programs. The program module will typically contain at least one CPU and some RAM, in addition to the minimum personality ROM.

At this point in the description of the invention, it would be desirable to be a little more explicit as to the nature of the various components illustrated in FIG. 5. As earlier noted, each module is physically enclosed to protect the circuitry and allow casual handling by the user. Each module is an "intelligent" piece of electronics that serves a particular purpose.

First, consider the power system. The power supply module 82 provides electrical power to the other modules. The power supply in most consumer electronics and most personal computers is a fairly "stupid" device. When turned on, it provides certain voltages at certain currents and little more. The power supply module 82 of the invention, in contrast, is a small computer whose purpose is to provide, monitor, and control the power used by the rest of the modules in the system. There may be smaller, subservient power modules scattered throughout the system, but the power supply module 82 must be present. During startup it coordinates the activities of any secondary power supply modules plugged into user connectors, controls the configuration of the power bus module 84, ascertains the power needs of the rest of the modules in the system 80, and determines whether or not the entire system can be supported. If the entire system cannot be supported, the main power supply module 82 determines what can be done to support at least part of the system. While the system is up and running, the power supply module assists with "hot" insertion and removal of modules (if that is possible with the given power bus module 84, as discussed in the following paragraph). If the power supply module is an uninterruptable power supply, it monitors the condition of the normal and backup power reserves. When normal power fails, the power supply module then notifies the system. The system might be able to shut down unnecessary modules to conserve the backup power. When backup power is running low, the power supply module alerts the rest of the system and assists the system in "shutting off" gracefully. Other modules can interrogate the power supply module to determine whether or not it has a reserve amount of power in the event of a power failure, how much power it can supply, at what voltages, and the like. Some power supply modules may have internal clocks that enable them to activate and deactivate the system 80 at selected times in order to perform automated tasks. The power supply module 82, then, is a power management computer.

Next, consider the method of delivering the power from the power supply to the components that need it. The power distribution mechanisms for current systems comprise either direct wiring with cables, or plain unbroken bus lines on backplanes. In either case, it is typically a copper lead or trace. In the system of the invention, the power to the database module 88 and the user modules 90 is routed from the power supply module(s) via the power bus module 84. The power bus module (depending on the type the user may wish to purchase) includes a multi-line bus 101 (FIG. 10) which may be able to be segmented into two or more sections, and may be able to cut off the power to individual user modules and database module. Using bus segmentation and additional, or secondary, power supply modules plugged in where user modules would normally go, the power bus module 84 may be able to have different voltages on the same relative pin numbers in two different connectors. The power bus module 84, whether standing alone (FIG. 6) or merged with the communications module (FIG. 7), is under the direct control of the power supply module 82 and is not reachable from the communications module 86. The internal configuration of the power bus module 84 is known only to the power supply module.

Figure 10:
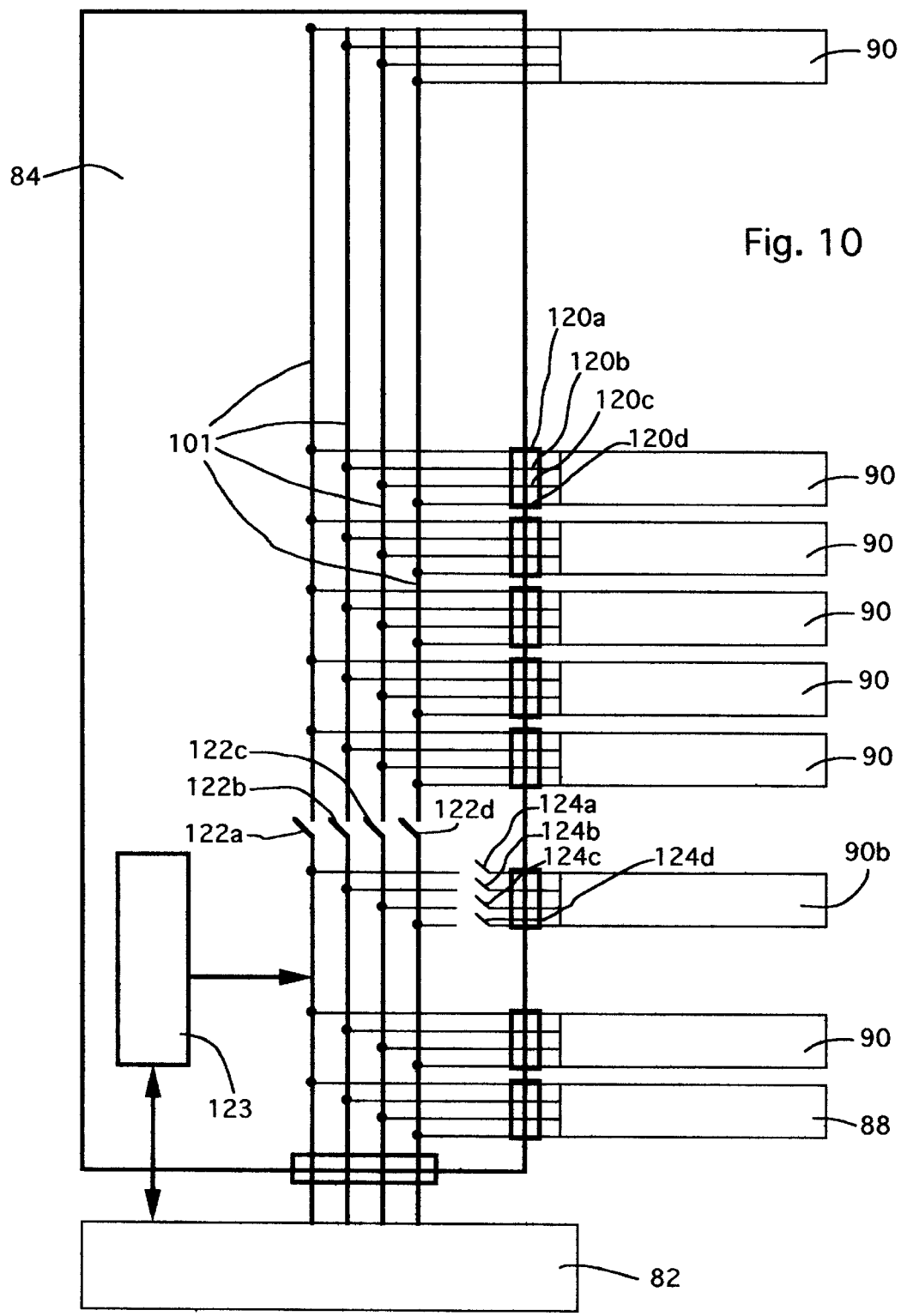
FIG. 10 is a schematic representation illustrating the power distribution technique of some of the components illustrated in FIG. 5.

For a more detailed explanation, turn to FIG. 10 which illustrates the power supply module 82, the database module 88, and several user modules 90 connected to the power bus module 84 by a plurality of connector pins 120a, 120b, 120c, 120d which are illustrated diagrammatically. A plurality of associated switches 122a, 122b, 122c, 122d for determining the continuity of the connector pins 120a, 120b, 120c, 120d are controlled by a CPU 123 which is part of the power bus module 84 and thereby segment the power bus module into sections. In turn, the power supply module 82 controls the CPU 123. There may be two or more segments created by such switches, or there may be no switches. Also, not all of the switches need to be opened at the same time. Some power bus lines may be segmented when others are not. In a similar fashion, switches 124a, 124b, 124c, 124d may be used to isolate an individual module, for example, module 90b, from the power supply module. Again, the switches 124a, 124b, 124c, 124d may or may not be present.

Once the components of the system have power, they next need to be able to communicate with one another. The communications module 86 in the system 80 is a small computer whose purpose is to provide communications paths for messages to be moved around the system. The communications module ascertains the communications characteristics of the user modules (data path width, clock speed, current buffer capacity, and the like) and determines the optimal method of transferring data from one module to another. Modules that wish to send data to another module tell the communications module where they wish to send the message, how long it is, and the like.

The communications module will schedule the message transfer based on software-controllable scheduling priorities, current buffer capacity of the receiving module, availability of the receiving module, and availability of a transfer path. The communications module, then, can be thought of as a message flow computer.

The underlying details of the operation of the communications module 86 will now be presented. The communications path for current personal computers and VME-based systems typically comprise copper bus lines on a backplane. Arbitration is for control of the entire bus. PCs and VME bus systems use devices like Interrupt Request (IRQ) lines, Direct Memory Access (DMA) lines, Bus Request (BR) lines, and Bus Grant (BG) lines to transfer data around the system across a passive backplane. In older systems, this required manual setting of IRQ and DMA lines to avoid conflicts between accessory boards. While so-called plug-and-play systems have automated this task, the underlying passive backplane technology remains. Because of the limited amount of information involved in acquiring the bus, current systems only need one pin for each of the signals (e.g. IRQ0, IRQ1, DMA1, BR1, BG0). The user modules in the system of the invention inform the communications module the destination and size of a block that needs to be transported. This information cannot be represented on a single pin. Consequently, a series of pins connecting the communications module with the other modules is designated the control port 110 (FIG. 11C). Multi-byte messages are passed between the communications module and the other modules via this control port. Using messages to communicate with a message scheduling entity rather than using single lines to communicate with a hardware arbitrator has the advantage that the message scheduling protocols can be changed in the software. With conventional systems, changing a pin assignment can invalidate hardware created to the previous standard. For example, in one revision of the standard, a pair of pins may be used for some part of the standard protocol. In the next revision, the protocol may be discontinued and the pins made available for use by custom hardware manufacturers. It is unlikely that hardware created to the older standard would function properly with newer hardware using the pins for other purposes, and the system integrator or end user would have to determine the cause of the system failure. In contrast, the system of the invention passes messages to the communications module regarding data transfers. One of these messages, which would not change across versions of the protocol standard, would be a protocol version number. If the communications module did not support the version of the protocol used by the user module, it could prevent the module from interfering with the rest of the system and notify the system operator of the problem. The communications module is an intelligent processor in its own right, and schedules the transfer and setting up of the physical connection for the data port 112 (FIG. 11C). The data port 112 of a module is the collection of lines used to pass messages between that module and another operating module, including but not limited to the communications module.

More specifically, as shown in FIG. 11C, the communications module 86 includes a programmable central processing unit (CPU) 102, Random Access Memory (RAM) 103, and a suitable ROM chip 104. Data port drivers 106 and control port drivers 108, and their associated access controls 109 in each instance, are configured in keeping with the physical characteristics of the communications paths. Consequently, the user modules 90, the main power supply module 82, and the database module 88 require only sufficient energy to drive a message to the port drivers on the other side of a physical connector, typically, 81A or 81B (see FIG. 6). The CPU 102 configures the drivers and access controls appropriately for any particular message transfer among the modules other than the power bus module 84 and the specialization module 92. There may be multiple paths, or one path. The transmission media may be copper traces, fiber optic cables, or the like. The length of the path may be a few feet, a few yards, or any appropriate distance. The port drivers convert the electrical or optical signals from the modules into signals appropriate to the internal physical construction of the communications module 86. While a single data path may be all that is available for data transfers between modules, there may also just as easily be two data paths, a crossbar switch, or any other connection architecture yet to be devised. The interface between the other modules and the communications module 86 has been constructed so that the protocols do not change with variations in the implementing hardware.

The database module 88 provides a place at a known location (or "address") for modules to advertise themselves and seek out other modules whose services they require. As previously noted, the system 80 is an object-oriented collection of mutually cooperating electronic modules for performing useful functions. In order for the modules to cooperate, they must be able to send and receive collections of data bytes, or messages, to and from one another. The modules use addresses to determine the destination of a message. An address is a unique number used to distinguish one object from another. A 32-bit address, for example, can distinguish between 4,294,967,296 different objects. In a traditional computer system, addresses refer to bytes in a single, conceptual memory. Physical memories on the boards actually present in the system are mapped onto sections of this overall conceptual memory, as illustrated in FIG. 11A. The sections of the conceptual memory do not have to be contiguous across all of the boards, nor do they have to be in order based on the position of the board on the bus. One board sending to another board acquires the bus, then asserts the destination memory address onto the bus. The other boards in the system observe the address and determine if the data is meant for them. If so, then the data bytes being transferred will be placed in the board's internal memory. Otherwise, the data will be ignored. In the system of the invention, addresses refer to conceptual "module space". A 16-bit address, for example, and suitable for purposes of the invention, can distinguish between 65,536 modules, including the power supply module 82, the communications module 86, and the database module 88. One address (0000, 0001, 0002, 0003 . . . 0011 . . .) refers to a particular module in the system, as illustrated in FIG. 11B.

Accessing functions within a particular module is performed with the contents of the message, and is not the concern of the communications module 86. After a message is transferred, the receiving module interprets it and determines if additional internal routing is necessary. Addresses are assigned to the physical location of the port in the communications module 86 used to interface with any of the other operating modules, specifically, the power supply module 82, the database module 88, and the user modules 90. The communications module 86 has an address like any other module in the system 80. Addresses for the system of the invention are preferably, though not necessarily, 16 bits wide as previously noted, and may be split into two eight bit fields: the "cabinet" number and the "slot" number. A "cabinet" is assumed to have a communications module 86, a power supply module 82, and a database module 88 along with some number of slots (up to 253 in number). While it might be desired to have a super-large communications module with more than 256 slots, it would be more likely to have multiple communications modules connected together.

To the knowledge of the inventor, the database module 88 does not have a hardware counterpart in current electronic systems. Current systems use the operating system software to manage the hardware. In UNIX systems, for example, it is common that drivers for new hardware be built right into the operating system. Other operating systems scan the hardware during the boot process. With the system of the invention, it is the hardware modules that announce themselves to the database module. They send information to be entered into the database (or repository) describing the services they can provide to other modules. The database module is given the address of the sender of the message by the communications module, and it publishes this address along with the information provided by the module. This whole system, then, is an object-oriented client-server system, with the database module functioning as a central repository of information regarding the current configuration of the system, the current services offered by the various parts of the system, and the like. Modules can query the database module 88 when searching for a particular service. If the service is not available at the moment, the modules can request to be notified when it does become available. This reduces polling, which is wasteful of time spent by the database module and also wasteful of the bandwidth of the communications module. The database module may also be a convenient place to insert a clock which is useful in a computer system for a variety of purposes.

Consumer electronics and specialized laboratory equipment may need to process inputs and generate outputs that are either non-digital, have timing requirements more stringent than can be accommodated by the communications object, or both. The specialization module 92 has been added to the basic design of the system of the invention to accommodate the special needs of consumer electronics and specialized laboratory equipment. Consumer electronics components, especially those meant to interface with current broadcast television and radio systems, may need to interface with analog signal lines (like the cable television signal line or the cables connecting to a speaker system). Currently, loose wiring is used for each point-to-point interface. A specialization module 92 with cable and audio connectors would allow the user to quickly add and remove components without contending with any external hookup cables. The command and control information of the equipment would be exchanged via the communications module, and the analog information, like television carrier waves and audio signals would be exchanged via the specialization module.

Laboratory equipment, which may be a user module 90 in the system of the invention, such as used in information gathering systems, often has need to exchange signals that are non-digital or have very tight coordination timing constraints. A particular line, pin, bus trace, or the like may be a voltage reference, for example. This reference is not a power line, but is a very precise standard of what a particular voltage "looks like". Also, there may be a requirement that multiple modules all perform some action at approximately the same time. A trigger pulse or clock signal would be used to activate the modules. The specialization module is used for such signals because the communications module is not likely to be sufficiently fast for proper propagation of such signals. Consider the case in which three user modules are used to sample analog inputs when they receive a certain signal. The requirements of the application are such that these modules must operate as close to the same instant as possible, and within a short period of time of the activation signal. Consider the case in which the communications module does not support simultaneous transfer of messages from one source module to multiple destination modules. In this situation, the signaling module would have to send three different messages. In order to satisfy the timing requirements, the sending module would have to request the three messages, the communications module would have to schedule the three messages (which involves the availability of the three sampling modules and a communications path), the three messages would have to be transferred, and the three messages would have to be decoded within the allowable delay period from the start signal. Also, these events would have to be coordinated such that the modules are activated at approximately the same instant. Given present technology, this is an unlikely set of circumstances. Using a communications module that can transfer a message to multiple receiving modules at one time eliminates two of the transfers, but the availability and decoding time issues still remain. With the specialization module of the invention, the sending module simply changes the voltage on one line of the connector to the specialization module. That voltage change propagates down the line, and when the sampling boards detect the change, they activate.

The following segment of this disclosure relating to the operation of the system of the invention is divided into two subsections, namely, signal routines and power routines.

The internal signal methods for consumer electronics are generally proprietary. The signal protocol for either computer architecture (that is, VME or PC) is generally as follows:

A board wishing to transfer data elsewhere in the system asserts a signal onto a bus request line.

An arbitrator elsewhere in the system grants access to the bus when the bus is available; the arbitrator is generally unaware of which board, of several, is seeking access to the bus, how much data is to be transferred, and the destination of the data. Insuring that all boards obtain fair access to the bus may be difficult.

When the board obtains access to the bus, it asserts addresses on address lines and data on data lines and transfers data until transfer is completed.

The signal protocol for the system of the invention will now be described. Each operating module has a control port 110 (FIG. 11C) including an input control port 110A and an output control port 110B. Each operating module also has a data port 112 including an input data port 112A, and an output data port 112B. Control ports are used to exchange information with the communications module to set up a data port exchange, that is, transmission of digital electronic messages between operating modules. Communication parameters are known bit patterns conforming to a software standard and relate to the characteristics of the data port, the available space in the receiving module for messages, and characteristics of messages that the sending module wants to send.

Static message transfer parameters for a particular module include parameters characteristic of the physical construction of that module for any message transfer. These include, for example:

Maximum message size that could ever be sent to a module.

Maximum speed that data could be clocked into a module.

Maximum speed that data could be clocked out of a module.

Whether or not the input data port 112A and output data port 112B of a module may be used at the same time. Note: If they are connected internally to the same memory, they cannot be used simultaneously. Therefore the communications module will only schedule one port for use at a time. This can affect the prioritization of message traffic around the system 80. The input control port 110A and output control port 110B of a module must be separate.

Input data port 112A "native" sizes that are supported. A "native" size is one that will result in no holes, that is, invalid data bytes in the memory into which the message is received during the transfer. The input control port 110A may be a fixed size, for example, 32 bits.

Output data port 112B "native" sizes that are supported. In this instance, a "native" size is one that will require no holes, that is, invalid data bytes in the memory from which the message is sent. The output control port 110B may also be a fixed size, for example, 32 bits.

Whether the input data port 112A has a clocking mechanism and, if so, what speeds are supported.

Whether the output data port 112B has a clocking mechanism, and, if so, what speeds are supported.

control port software protocol version number.

Dynamic message transfer parameters for a particular module include parameters characteristic of the module at the moment. These include, for example:

Maximum message size that can currently be sent to a module.

Whether input memory is busy internally.

Whether output memory is busy internally.

Message parameters are parameters pertaining to a particular message. These include, for example:

Message destination module or module set address.

Message source module (provided to destination module by communications module).

Message identification number for referencing when the transfer is about to begin.

Message format including information whether the message is packed or not, and if not, what width it is decimated for.

Message length in bytes.

Whose clock (that is, sender, receiver, or communication module) is being used and what is the clocking style, that is synchronous or asynchronous.

A module wishing to send a message to another module in the system 80 uses the control ports 110 to communicate message information to the communications module 86. This information includes the communication parameters previously mentioned such as message destination, length, packing, and the like. The following is a description of this transfer protocol with reference to the flow charts presented in FIGS. 12 and 13.

Figure 12:
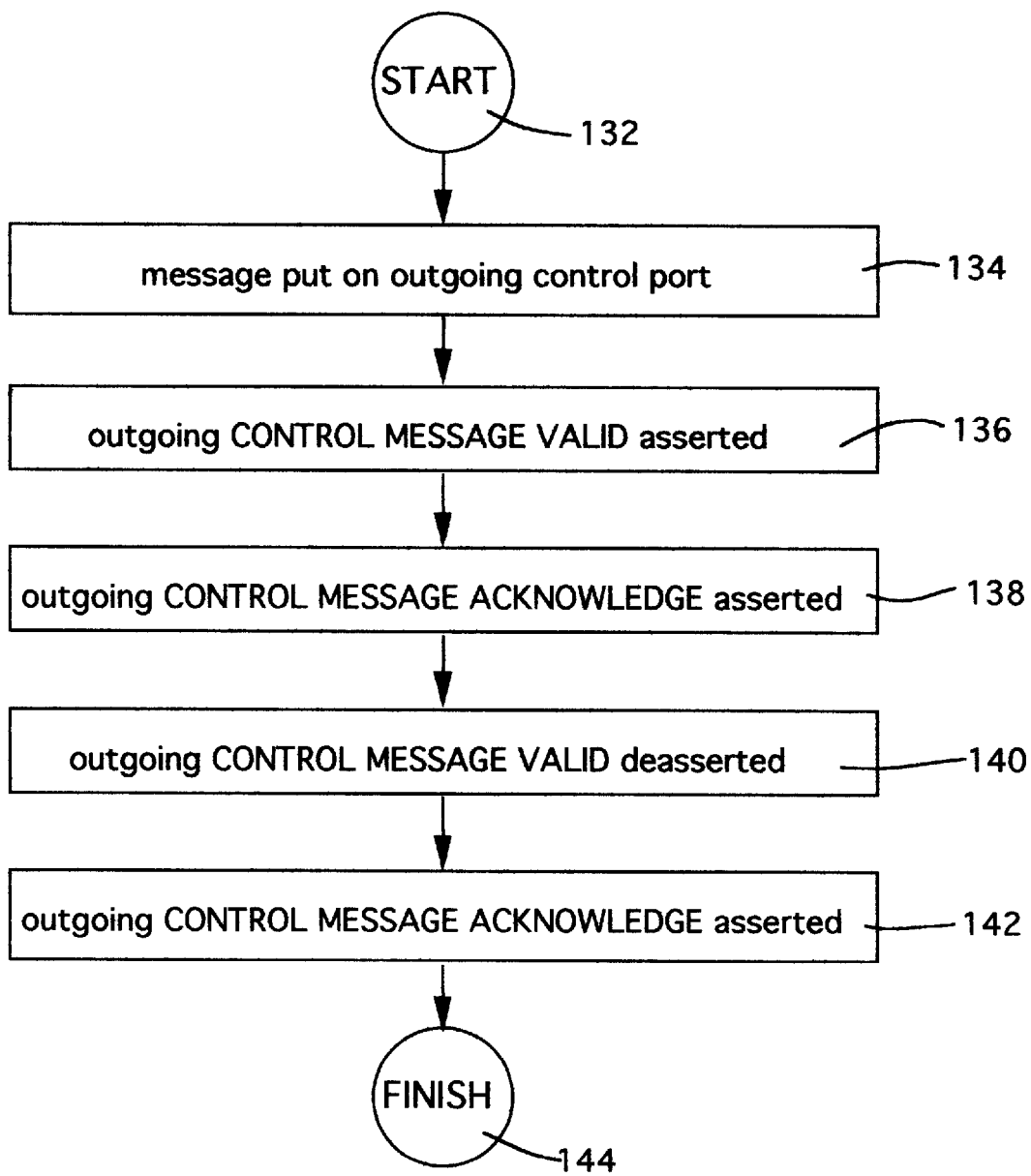
FIG. 12 is a logic flow chart illustrating, serially, functions performed by the components of the system of the invention, specifically, the message transfer protocol from a user module to a communications module via a control port.

Initially, viewing FIG. 12, at the START circle 132, the user module 90 holds a message to be sent to the communications module 86. The message is placed on the output control port 110B as indicated at step 134 and the user module asserts the outgoing CONTROL MESSAGE VALID condition as indicated at step 136. In turn, when the communications module has received and stored the message, it asserts the outgoing CONTROL MESSAGE ACKNOWLEDGE condition as indicated at step 138. Thereupon, the user module deasserts the outgoing CONTROL MESSAGE VALID condition, step 140, and thereafter the communications module deasserts the outgoing CONTROL MESSAGE ACKNOWLEDGE condition at step 142. At the FINISH circle 144, the message has been successfully transferred.

Figure 13:
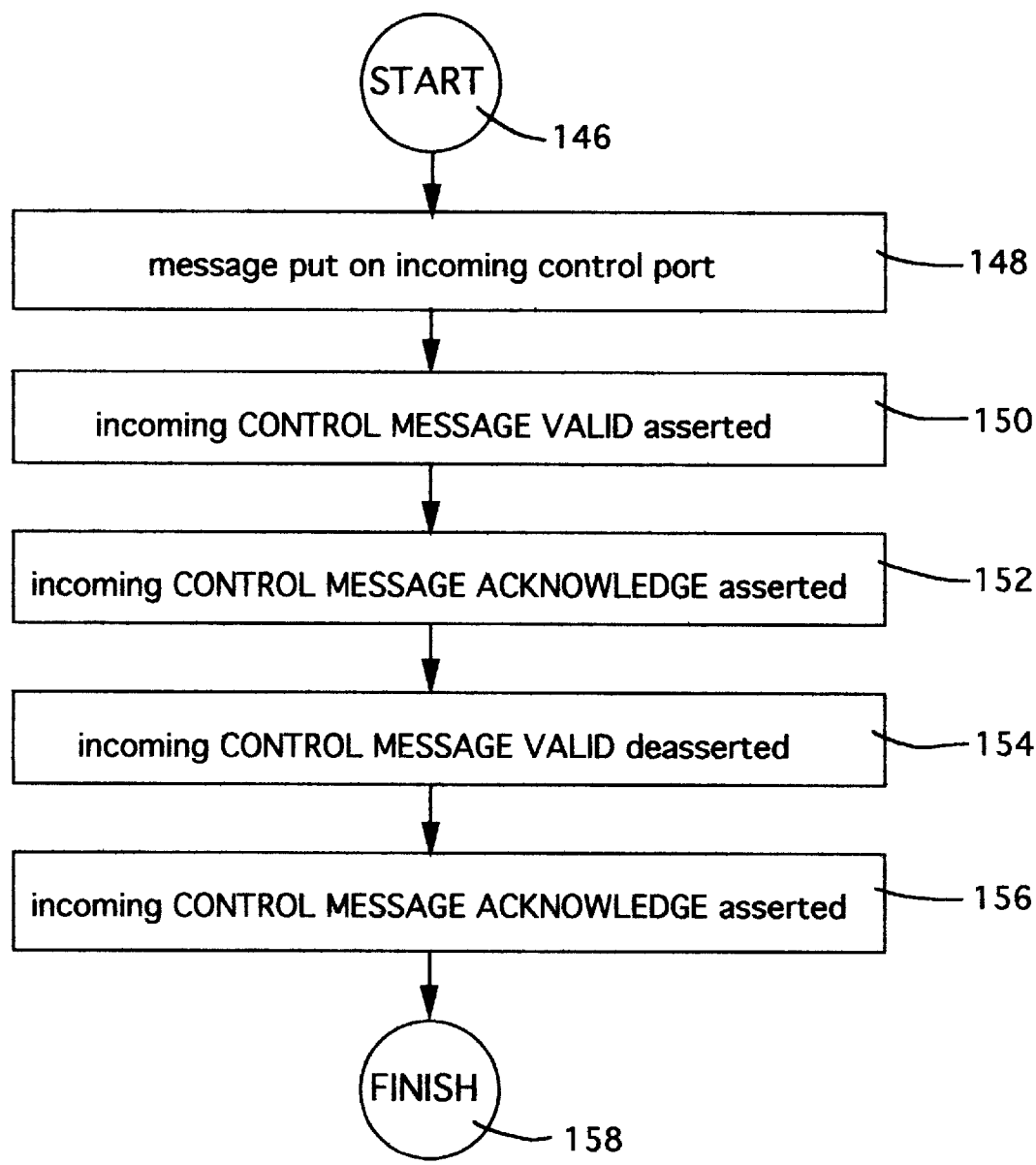
FIG. 13 is a logic flow chart illustrating, serially, functions performed by the components of the system of the invention, specifically, the message transfer protocol from the communications module to the user module via the control port.

Continuing, viewing FIG. 13, at the START circle 146, the communications module 86 holds a message to be sent to the user module 90. The message is placed on the input control port 110A as indicated at step 148 and the communications module asserts the incoming CONTROL MESSAGE VALID condition as indicated at step 136. In turn, when the user module has received and stored the message, it asserts the incoming CONTROL MESSAGE ACKNOWLEDGE condition as indicated at step 152. Thereupon, the communications module deasserts the incoming CONTROL MESSAGE VALID condition, step 154, and thereafter the user module deasserts the incoming CONTROL MESSAGE ACKNOWLEDGE condition at step 156. At the FINISH circle 158, the message has been successfully transferred.

Figure 14A:
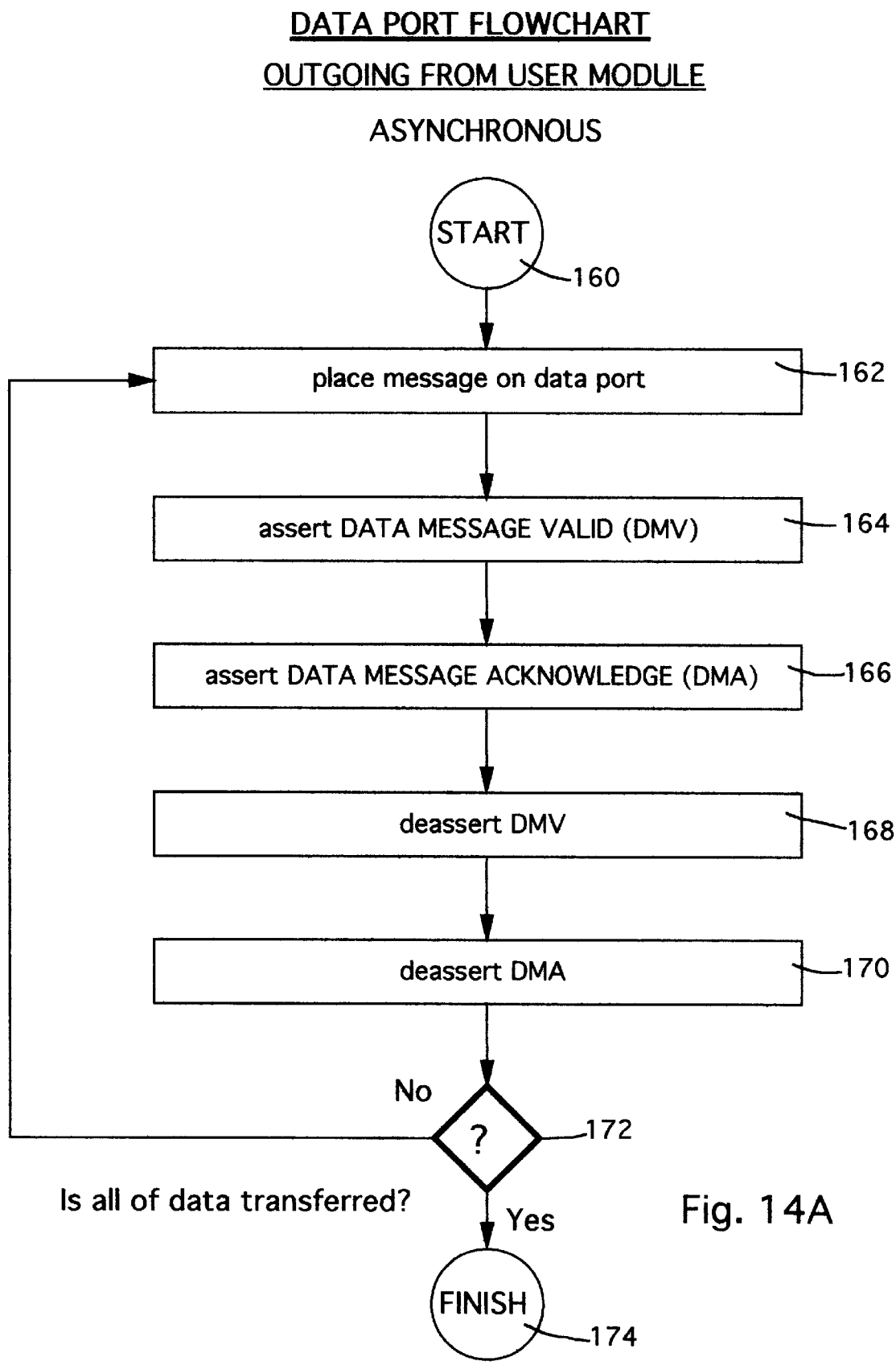
FIG. 14A is a logic flow chart illustrating a method of exchanging data via the data ports of operating modules using an asynchronous transfer technique.
Figure 14B:
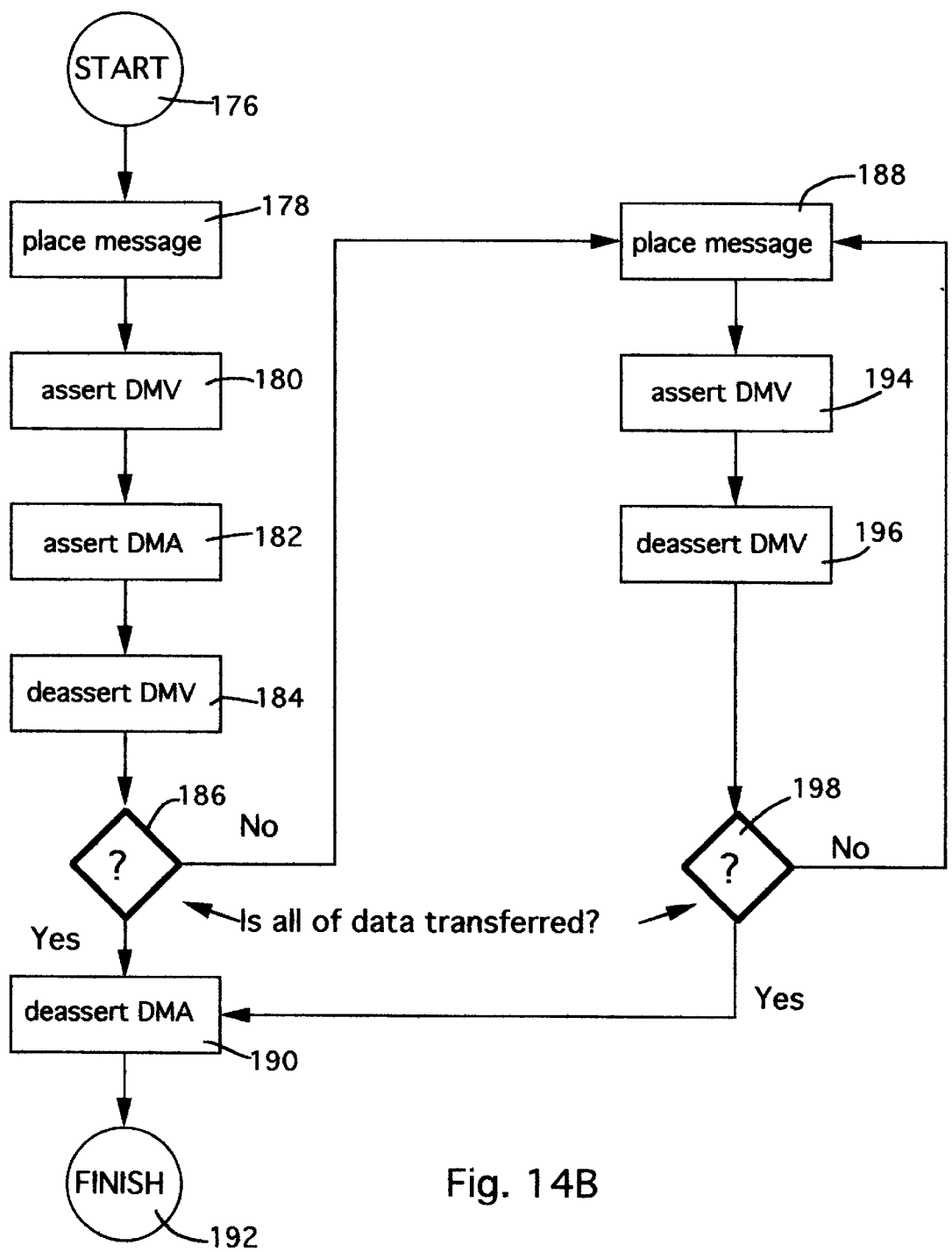
FIG. 14B is a logic flow chart illustrating a method of exchanging data via the data ports of operating modules using a synchronous transfer technique with the sending module being master of the transaction.
Figure 14C:
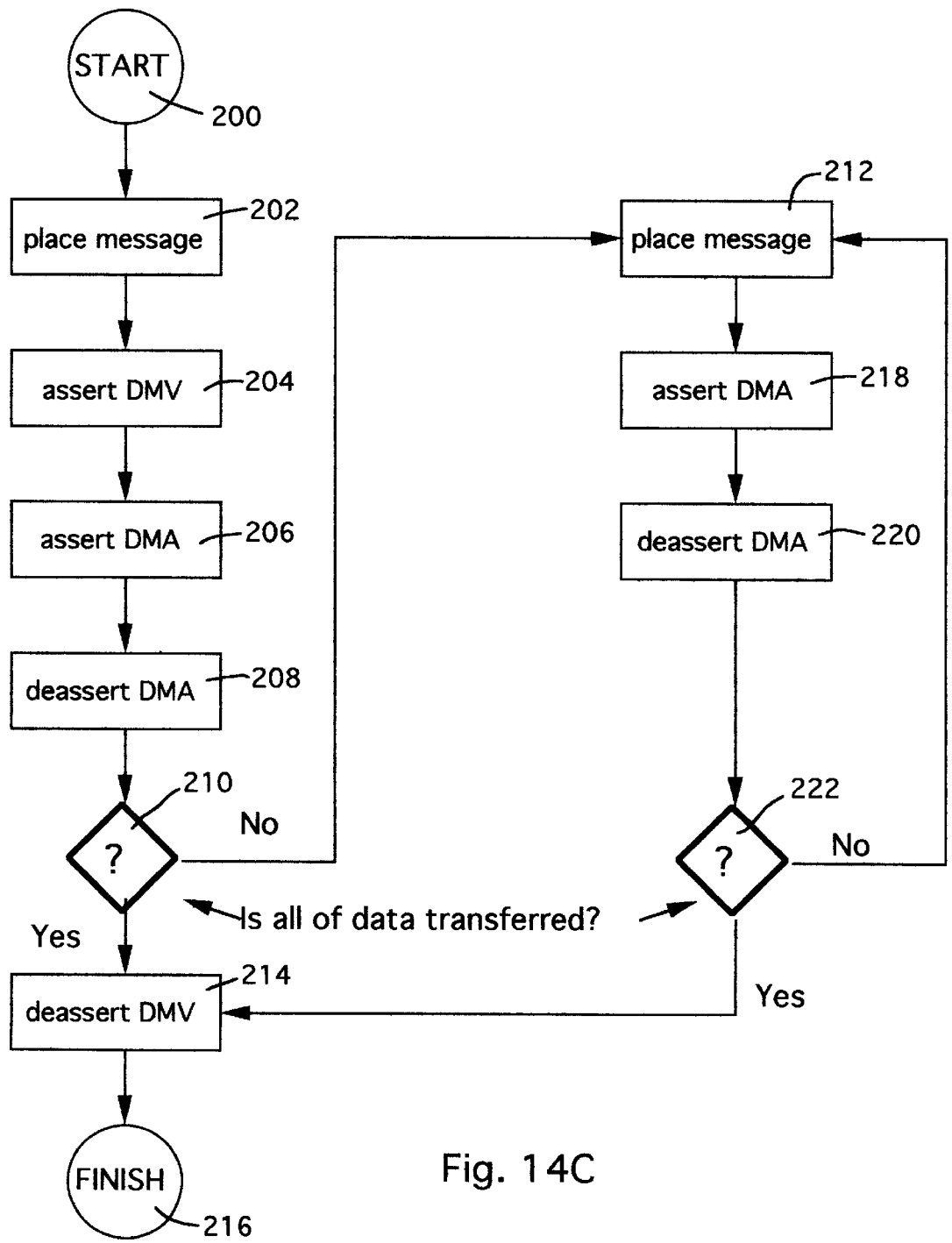
FIG. 14C is a logic flow chart illustrating a method of exchanging data via the data ports of operating modules using a synchronous transfer technique with the receiving module being master of the transaction.

Once the message parameters have been transferred to the communications module, the communications module will schedule a data port transfer. This involves waiting for the sender, the receiver, and the data path all to be available. When the scheduling of the transfer has been completed and the sender and the receiver have been notified via the control ports, the actual transmission via the data ports is achieved using the transfer protocol describe with reference to the flow charts presented in FIGS. 14A–14C.

With the aid of FIG. 11C. from the perspective of the sending module, there are three methods of exchanging data via the data ports 112. A fourth method is made possible by the use of two of the first three. These methods will be explained generally here and in more detail in the following paragraphs. The reason for having multiple methods will be explained shortly. The first method is asynchronous transfer. In asynchronous transfer, the sender and receiver handshake each exchange across the data port lines. The second method is synchronous transfer with the sending module being master of the transaction. The third method is synchronous transfer with the receiving module being master of the transaction. In synchronous transfer, one of the parties provides the clocking for the data exchange, and the other party is presumed to be able to keep up. The fourth method uses the synchronous transfer protocols with the sending and receiving modules, but the clock is provided by the communications module. The sender follows the protocol as if the receiver were the master, and the receiver follows the protocol as if the sender were the master.

The reasons for having multiple methods will now be explained. Providing multiple clocking schemes assures the optimum performance of the hardware in the system. Asynchronous transfer is the most flexible in terms of allowing modules with different transfer speed capabilities to exchange messages. This style must be implemented in all modules, and allows modules to communicate with each other in systems where the communications module does not provide clocking and the other modules do not have the ability to adjust their transfer clocking rate. Synchronous transfer with the sender, the receiver, or the communications module as the master is faster than asynchronous transfer, since the acknowledge portion of the cycle is unnecessary.

The asynchronous transfer mode will now be described. Initially, viewing FIG. 14A, at the START circle 160, the sending user module 90 holds a message to be sent to some other module 82, 86, 88, or 90. The message is placed on the output data port 112B as indicated at step 162 and the user module asserts the outgoing DATA MESSAGE VALID condition as indicated at step 164. In turn, when the receiving module has received and stored the message, it asserts the incoming DATA MESSAGE ACKNOWLEDGE condition as indicated at step 166. Thereupon, the sending user module deasserts its outgoing DATA MESSAGE VALID condition, step 168, and thereafter the receiving module deasserts the incoming DATA MESSAGE ACKNOWLEDGE condition at step 170. At a decision step 172 following step 170, if there is more data to be exchanged, the cycle continues back at step 162. Otherwise, at the FINISH circle 174, the message has been successfully transferred.

Now consider the synchronous transfer mode with the sending user module 90 as the master. Initially, viewing FIG. 14B, at the START circle 176, the sending user module 90 holds a message to be sent to some other module 82, 86, 88, or 90. The message is placed on the output data port 112B as indicated at step 178 and the user module asserts the outgoing DATA MESSAGE VALID condition as indicated at step 180. In turn, when the receiving module has received and stored the message, it asserts the incoming DATA MESSAGE ACKNOWLEDGE condition as indicated at step 182. Thereupon, the sending user module deasserts its outgoing DATA MESSAGE VALID condition, step 184. At this point, a decision step 186 is performed. If there is more data to be exchanged, the cycle proceeds to step 188. Otherwise, the receiving module deasserts the incoming DATA MESSAGE ACKNOWLEDGE condition at step 190, whereupon at the FINISH circle 192, the message has been successfully transferred. In the event that more data is to be exchanged and the cycle proceeds to step 188, the next portion of the message is placed on the output data port 112B and the user module asserts the outgoing DATA MESSAGE VALID condition as indicated at step 194. As the sending user module is providing the clock for the transfer, it waits a suitable amount of time for the receiving module to receive and store the message. Thereupon, the sending user module deasserts its outgoing DATA MESSAGE VALID condition, step 196. At decision step 198, if there is more data to be exchanged, the cycle continues back to step 188. Otherwise, the receiving module deasserts the incoming DATA MESSAGE ACKNOWLEDGE condition at step 190, whereupon at the FINISH circle 192, the message has been successfully transferred.

Now consider the synchronous transfer mode with the receiving module 82, 86, 88, or 90 as the master. Initially, viewing FIG. 14C, at the START circle 200, the sending user module 90 holds a message to be sent to some other module 82, 86, 88, or 90. The message is placed on the output data port 112B as indicated at step 202 and the user module asserts the outgoing DATA MESSAGE VALID condition as indicated at step 204. As the receiving module is providing the clock for the transfer, it waits a suitable amount of time to receive and store the message. Thereupon, it asserts the incoming DATA MESSAGE ACKNOWLEDGE condition as indicated at step 206. After another suitable period, the receiving module deasserts the incoming DATA MESSAGE ACKNOWLEDGE condition as indicated at step 208. At decision step 210, if there is more data to be exchanged, the cycle proceeds to step 212. Otherwise, the sending user module deasserts the outgoing DATA MESSAGE VALID condition at step 214, whereupon at the FINISH circle 216, the message has been successfully transferred. At step 212, the next portion of the message is placed on the output data port 112B. As the receiving module is providing the clock for the transfer, it waits a suitable amount of time to receive and store the message. Thereupon, it asserts the incoming DATA MESSAGE ACKNOWLEDGE condition as indicated at step 218. After another suitable period, the receiving module deasserts the incoming DATA MESSAGE ACKNOWLEDGE condition as indicated at step 220. At decision step 222, if there is more data to be exchanged, the cycle continues back to step 212. Otherwise, the sending user module deasserts the outgoing DATA MESSAGE VALID condition at step 214, whereupon at the FINISH circle 216, the message has been successfully transferred.

Figure 15:
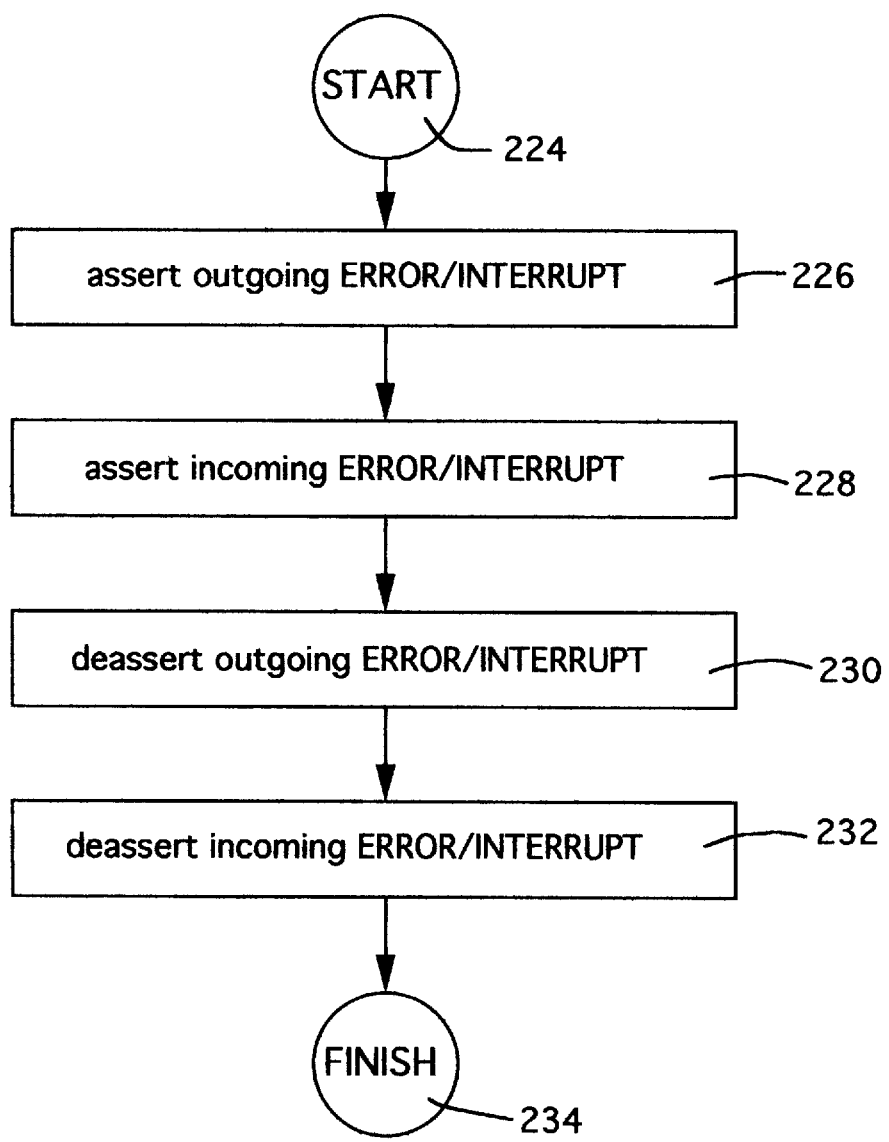
FIG. 15 is a logic flow chart illustrating a method of exchanging data via the data ports of operating modules using the transfer techniques of any of FIGS. 14A, 14B, or 14C in which either the communications module or one of the parties in the message transfer wishes to interrupt the transfer.

For completeness of the description of the invention, consider now that event in which either the communications module 86 or one of the parties in the message transfer in the processes just described wishes to interrupt the transfer. Such interruptions may occur because of an error or a desire of the communications module to reclaim a data path. Viewing FIG. 15, at start circle 224, a sending module wishes to interrupt transfer of a message to a receiving module. At step 226, the sender module asserts the outgoing ERROR/INTERRUPT condition. The receiving module asserts its incoming ERROR/INTERRUPT condition at step 228. After a suitable period of time, the sending module deasserts the outgoing ERROR/INTERRUPT condition, step 230 and the receiving module deasserts it incoming ERROR/INTERRUPT condition, step 232. In view of the fact that the communications module has been monitoring this activity, the communications module may reclaim the data path and the transaction is considered terminated at finish circle 234. At this point, the sender will have to reschedule the transfer operation. It will be appreciated that a similar routine may be used should either the receiver or the communications module wish to interrupt a message transfer.

The sending module may send control port messages anytime there is a data port transfer to be scheduled. It does not have to wait for the current data transfer to be completed.

The power routines to be discussed are taken from the point of view of performing a complete cold start. There are "sleep" modes used in current systems to save power, but these would generally be considered to be modes of devices which have already been powered up. The power method for consumer electronics and either computer architecture is generally as follows: one flips a switch or presses a button and, as a result, all the power for full system operation is then provided. The power method for the system of the invention employs two stages for every operating module in the system. In stage one power-up, the "personality" CPU 102 and ROM 104 of a module are active. The module can negotiate with the communications module to send messages to other modules as well as respond to informational queries from other modules. It cannot, however, perform any other functions. In stage two power-up, a module is completely active. All of the functions the module was designed to provide are available. A brief description of the power-up process follows, step by step, and assumes no errors during the procedure.

Figure 16A:
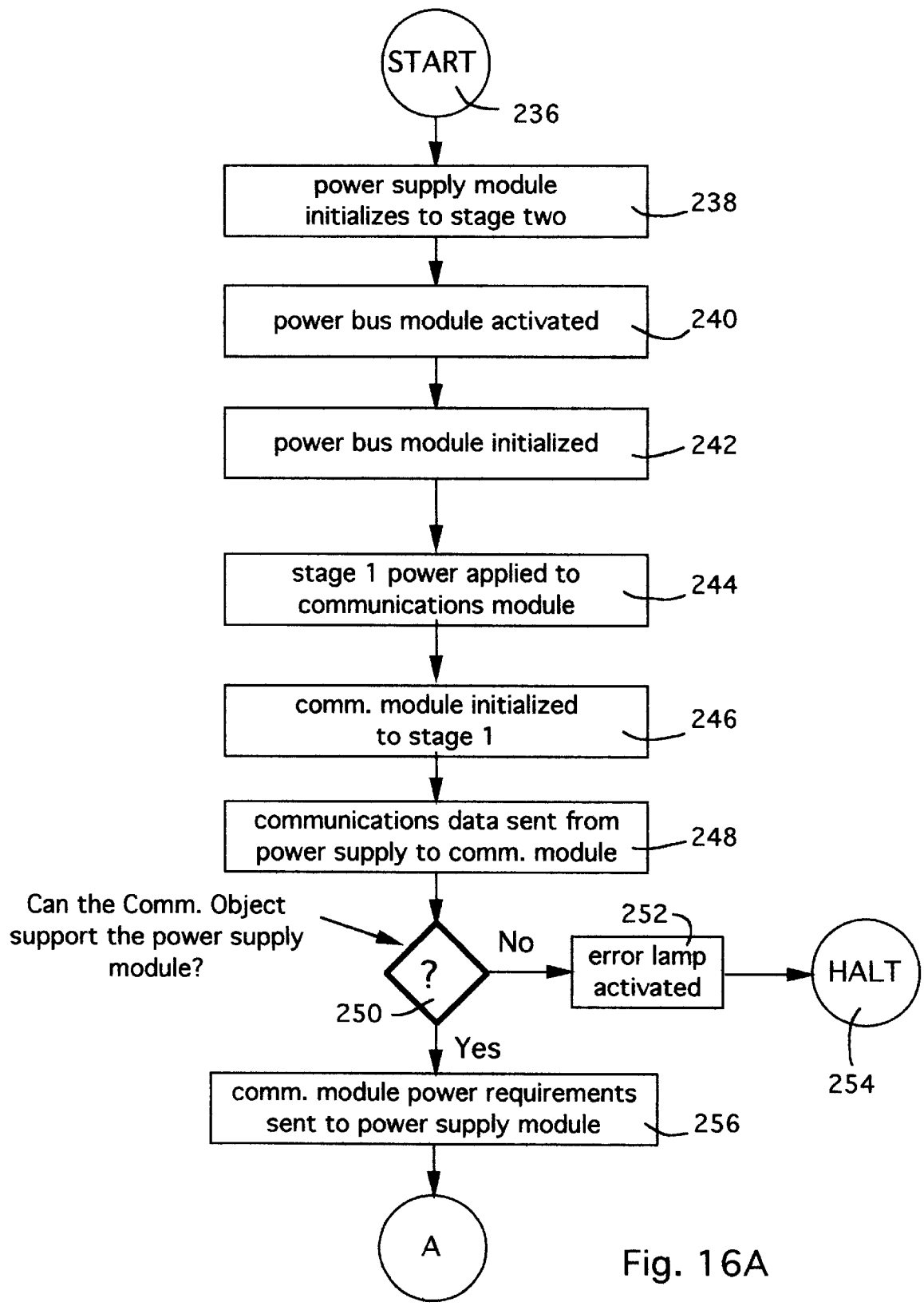
FIG. 16A is a logic flow chart illustrating the power-up routine for the complete power-up of a power supply module and for a power bus module, and for the partial power-up of a communications module.

Initially, viewing FIG. 16A, at the START circle 236, the system 80 is quiescent. The primary power supply module 82 initializes to stage two power-up as a result of the user flipping a switch, or a timer activation, or similar means, as indicated in step 238. In this condition, everything within the power supply module 82 is functional, but no voltage is applied to any of the power distribution pins. At step 240, the primary power supply module 82 supplies power to the power bus module 84. The primary power supply module 82 then determines the capabilities of the power bus module and initializes it, as indicated at step 242. At step 244, the primary power supply module 82 applies stage one power to the communications module 86, whereby at step 246 the communications module initializes to stage one power-up. The primary power supply module 82 then uses the control port to send information to the communications module, as indicated at step 248. This information includes which control port software version the primary power supply module 82 uses, and what message widths, clocking schemes, and the like, the primary power supply module 82 supports on the data port.

At decision step 250, the communications module 86 determines whether it can support the primary power supply module 82. If it is unable to, it activates the communications error lamp 128 contained in the primary power supply module 82, step 252, and the power-up process must halt at circle 254. If the communications module 86 is able to support the primary power supply module 82, then at step 256 the communications module informs the primary power supply module (via the control port) what voltages and currents it requires to initiate power stage two. The control port is used for this purpose instead of the message port because the communications module has not yet been powered to the stage two condition.

Figure 16B:
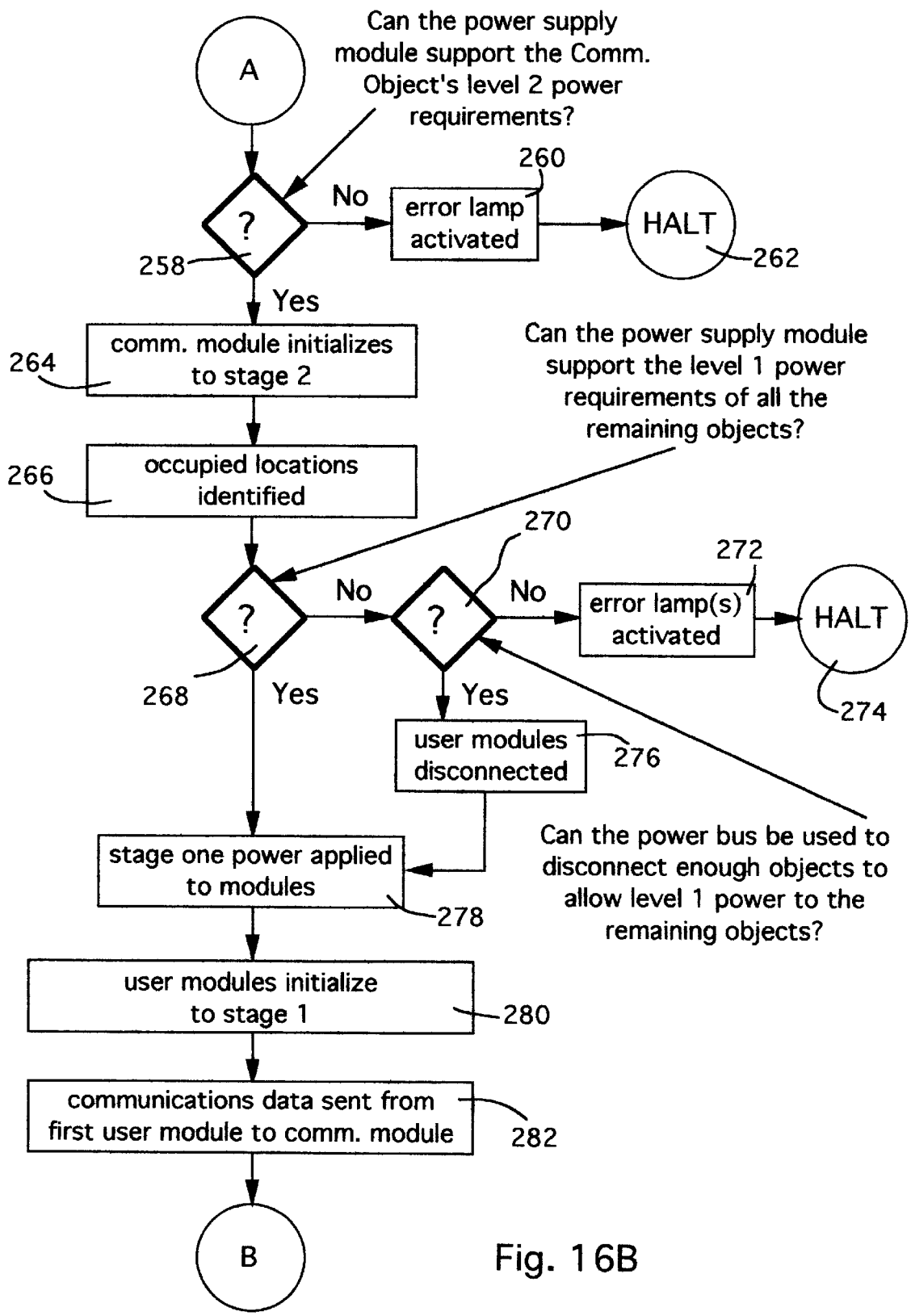
FIG. 16B is a logic flow chart illustrating the completion of the power-up of the communications module and for the partial power-up of user modules and a database module.

At decision step 258, seen in FIG. 16B, the primary power supply module 82 determines whether it can provide the appropriate voltages and currents to support the stage two power requirements of the communications module. If it is unable to, then at step 260 the primary power supply module 82 activates a power error lamp 400 contained in the communications module, and the power-up process for the system halts at circle 262. If the primary power supply module 82 can power the communications module up to stage two, then at step 264 the primary power supply module 82 applies the correct voltage to the appropriate power pins and the communications module attains power stage two. At step 266, the communications module provides the primary power supply module 82 with the locations of any modules that are connected to the communications module. This message is exchanged via the data port 112, which involves the use of the control port 110.

At decision step 268, the primary power supply module 82 determines whether it can support stage one power for all of the modules connected to the communications module. If it is unable to so power all of the modules, then at decision step 270, the primary power supply module 82 determines whether it can use the power bus module 84 to disconnect enough modules to support stage one power for the remainder. If this result also cannot be achieved, then at step 272 the primary power supply module 82 instructs the power bus module which power error lamps to illuminate in the user modules. Enough lamps will be illuminated so that, if the user were to remove those modules from the system, the remaining modules in the system could be powered to stage one. The power-up process must then halt, as indicated at circle 274. If, at decision step 270, the power bus module could be used to disconnect enough user modules to power the remaining modules to stage one, then at step 276 the primary power supply module 82 instructs the power bus module 84 to disconnect enough user modules so that the remaining modules in the system can be powered to stage one. The power bus module will then illuminate the power error lamps of the modules so disconnected. At step 278, the primary power supply module 82 applies stage one power to the appropriate power pins on the power bus module, thus applying stage one power to the remaining user modules in the system. Step 278 is also reached if the primary power supply module 82 is able to support all of the modules at decision step 268. From this point on, the phrase "all of the user modules" means any user modules that have not been disconnected from the power bus module by the primary power supply module 82. The "current user module" is the module that the communications module or primary power supply module 82 is considering at the moment.

Figure 16C:
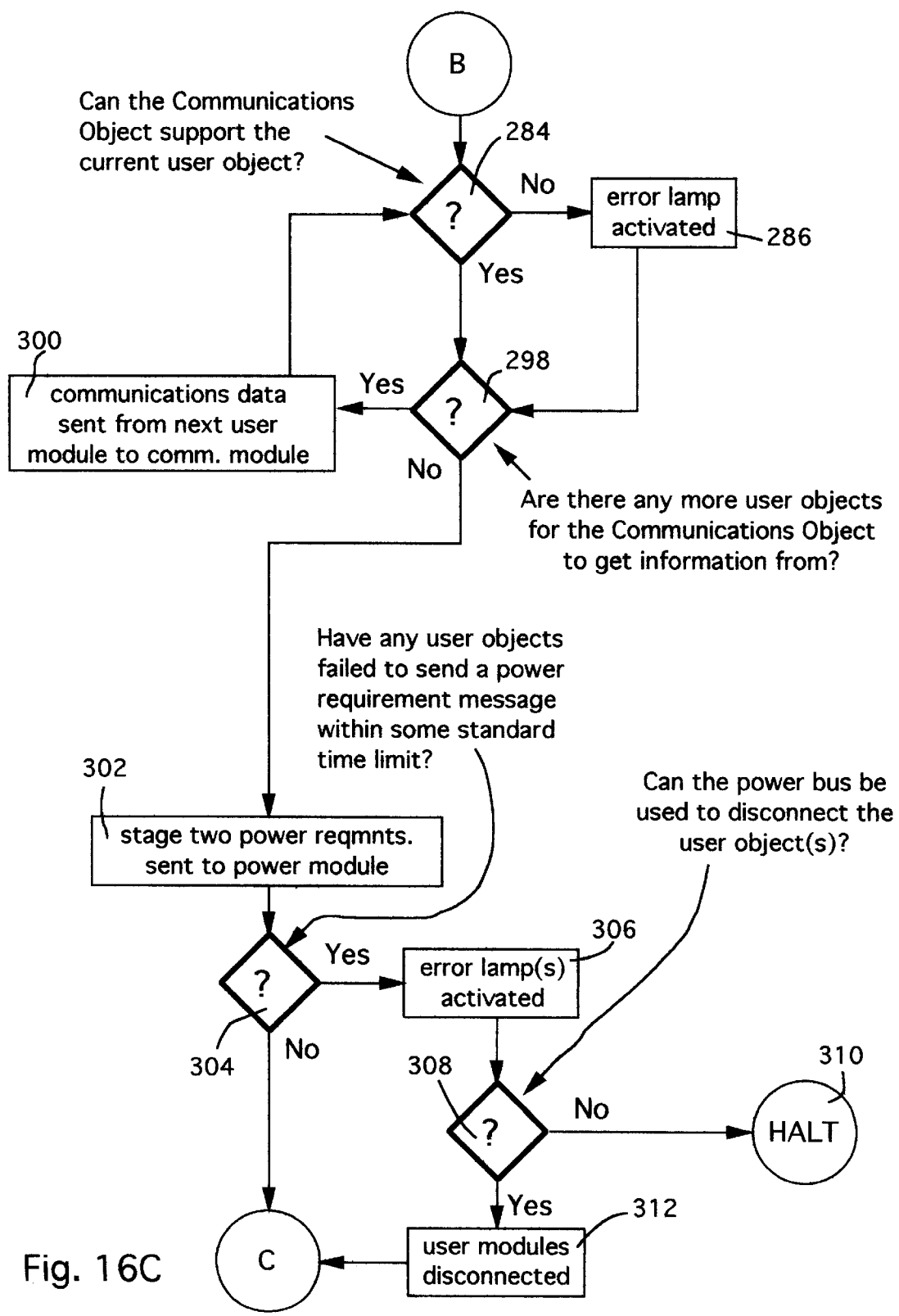
FIG. 16C is a logic flow chart illustrating the continuation of the power-up process for the user modules and the database module.

At step 280, all of the user modules initialize to stage one. At step 282, the communications module receives a message from the first user module via the control port 110. That message specifies what control port software version the module uses, and what message widths, clocking schemes, and the like, the module supports on the data port. At decision step 284, shown in FIG. 16C, the communications module determines whether it can support the current module. If it is unable to, then it illuminates the communications error lamp on the current user module at step 286.

At decision step 298, the communications module determines if there are any more user modules from which to receive information. If there are more such modules, then at step 300 the communications module receives a message from the next user module via its control port. That message specifies what control port software version the module uses, and what message widths, clocking schemes, and the like, the module supports on the data port. The procedure continues at step 284. If there are no additional user modules from which to receive information concerning the parameters mentioned above, then at step 302 all of the user modules send their stage two power requirements to the primary power supply module 82. At decision step 304, the primary power supply module 82 determines whether all of the user modules have provided their stage two power requirements. If any user modules have not, then at step 306 the primary power supply module 82 directs the power bus module 84 to illuminate the appropriate power error lamps in the user modules. At decision step 308 the primary power supply module 82 determines whether the missing modules can be disconnected via the power bus module. If they cannot, then the power-up process halts at circle 310. If they can, then at step 312 the primary power supply module 82 instructs the power bus module to disconnect the user modules. Depending on the configuration of the power bus module, this may cause the loss of other user modules.

Figure 16D:
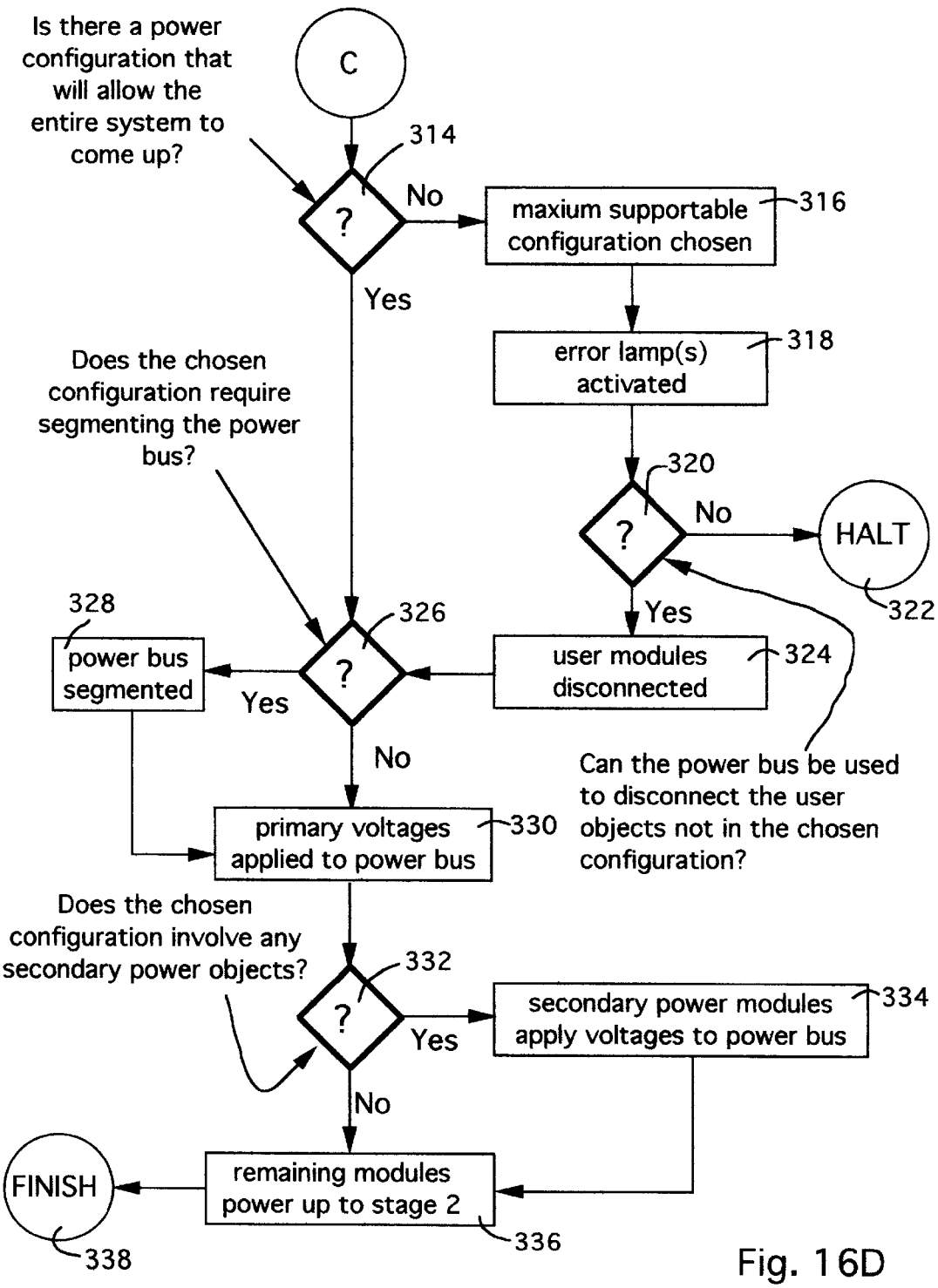
FIG. 16D is a logic flow chart illustrating the completion of the power-up process for the user modules and the database module.

At decision step 314, shown in FIG. 16D, the primary power supply module 82 determines whether there is a combination of power bus line connections, voltages and currents from the primary power supply module 82, and voltages and currents from any secondary power supply modules that would allow all of the modules to power up to stage two. If there is no adequate combination, then at step 316 the primary power supply module 82 chooses the maximum valid set of user modules that could be supported. This set must contain the database module 88. The primary power supply module 82 instructs the power bus module to illuminate the power error lamps in those user modules which are not in the chosen configuration, as shown in step 318.

At decision step 320, the primary power supply module 82 determines whether the power bus module can be used to disconnect the user modules not in the chosen configuration. If those user modules not so chosen cannot be disconnected, the power-up process halts at circle 322. If those user modules can be disconnected, then the primary power supply module 82 instructs the power bus module to disconnect the user modules not in the chosen configuration, as indicated in step 324.

Decision step 326 is reached either after step 324 or in the event there had been an initial configuration that would have supported the entire system in decision step 314. At decision step 326, the primary power supply module 82 determines whether the final chosen configuration requires segmenting the power bus. If so, then at step 328 the primary power supply module 82 instructs the power bus module to segment the power bus appropriately. At step 330, reached either after decision step 326 or after step 328, the primary power supply module 82 provides the voltages it will be responsible for on the appropriate power bus lines. At decision step 332, the primary power supply module 82 determines whether the chosen configuration involves any secondary power supply modules. If so, then the primary power supply module 82 transmits messages to the appropriate secondary power supply modules 90, instructing them to assert their designated voltages. At step 336, reached either from decision step 332 or step 334, the remaining modules in the chosen configuration complete power-up to stage two. Finally, at circle 338, the system power-up procedure is completed.

At this point, all the powered-up modules register themselves with the database module 88 and the system 80 then actually boots, generally considered to be a software matter.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. An object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules, said power bus means including a power bus module having external mechanical and electromagnetic interconnecting means for mechanical and electromagnetic interconnection with said power supply module, with said database module, and with each of said user modules;

said communications module and said power bus module being integrated as a unit and having external mechanical and electromagnetic interconnecting means for mechanical and electromagnetic interconnection with said power supply module, with said database module, and with each of said user modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode;

whereby configuration and operation of said modular object-oriented electronic component system may be achieved without accessing said internal electronic apparatus of any of said operating modules.

2. An object-oriented modular electronic component system as set forth in claim 1 wherein said communications module is responsive to the presence of each of said other operating modules, when in the operative mode, to determine the parameters necessary for transmitting the digital electromagnetic messages among all of said modules.

3. An object-oriented modular electronic component system as set forth in claim 1 including:

control port means for electromagnetically connecting each of said power supply module, said data base module, and said user module to said communications module for transmission of digital electromagnetic messages solely between said communications module and each of said power supply module, said data base module, and said user module; and data port means for electromagnetically connecting each of said power supply module, said data base module, said communications module, and said user module for unrestricted transmission of digital electromagnetic messages among all of said operating modules.

4. An object-oriented modular electronic component system as set forth in claim 1 wherein said communications module includes:

a plurality of message transfer paths for transmission of digital electromagnetic messages;

a central processing unit for scheduling transfers of the digital electromagnetic messages and for controlling access of the digital electromagnetic messages to said data transfer paths; and port driver means for converting the digital electromagnetic messages from the electromagnetic form as transmitted and received by any one of said user module, said data base module, said power supply module, and said communications module into digital electromagnetic messages in the electromagnetic form as propagated by said message transfer paths.

5. An object-oriented modular electronic component system as set forth in claim 1 wherein said power bus means includes:

a multi-line bus for interconnecting a plurality of said user modules and said database module to said power supply module; and switch means for selectively interconnecting said plurality of user modules, said database module and said power supply module.

6. An object-oriented modular electronic component system as set forth in claim 1 wherein each of said operating modules includes:

a ROM component containing information regarding the characteristics and operation of said operating module; and microprocessor means for transmitting the information contained in said ROM component to another one of said operating modules.

7. An object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode; and said plurality of self-contained operating modules including a specialization module for transmitting non-digital and trigger pulse type electrical signals among said user modules;

whereby configuration and operation of said modular object-oriented electronic component system may be achieved without accessing said internal electronic apparatus of any of said operating modules.

8. An object-oriented modular electronic component system as set forth in claim 7 wherein said power bus means includes a power bus module having external mechanical and electromagnetic interconnecting means for mechanical and electromagnetic interconnection with said power supply module, with said database module, and with each of said user modules; and wherein said communications module and said specialization module are integrated as a unit and have external mechanical and electromagnetic interconnecting means for mechanical and electromagnetic interconnection with said power supply module, with said database module, and with each of said user modules.

9. An object-oriented modular electronic component system as set forth in claim 7 wherein said power bus means includes a power bus module having external mechanical and electromagnetic interconnecting means for mechanical and electromagnetic interconnection with said power supply module, with said database module, and with each of said user modules; and wherein said power bus module, said communications module and said specialization module are all integrated as a unit and have external mechanical and electromagnetic interconnecting means for mechanical and electromagnetic interconnection with said power supply module, with said database module, and with each of said user modules.

10. An object-oriented modular electronic component system as set forth in claim 1 wherein said external mechanical and electromagnetic connecting means includes:

a plurality of outwardly projecting mounting pegs on at least some of said operating modules;

at least some of said operating modules including a male electromagnetic connector having a defined positional relationship with respect to said mounting pegs;

at least some of said operating modules including a female electromagnetic connector engageable with said male electromagnetic connector; and at least some of said operating modules having a plurality of bores having a defined positional relationship with respect to said female electromagnetic connector and positioned to matingly receive said mounting pegs when a pair of said operating modules is joined.

11. A method of initializing operation of an object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode;

control port means for electromagnetically connecting said power supply module, said data base module, and said user module to said communications module for transmission of digital electromagnetic messages solely between said communications module and each of said power supply module, said data base module, and said user module; and data port means for electromagnetically connecting each of said power supply module, said data base module, said communications module, and said user module for unrestricted transmission of electromagnetic signals among all of said operating modules; and wherein each of said operating modules includes:

a ROM component containing information regarding the characteristics and operation of said operating module; and microprocessor means for transmitting the information contained in said ROM component to another one of said operating modules whereby configuration and operation of said modular object-oriented electronic component system may be achieved without accessing said internal electronic apparatus of any of said operating modules;

the method comprising the operations of:

(a) mechanically and electrically interconnecting the power bus means and all of the operating modules;

(b) activating the power supply module;

(c) operating the power supply module to initially activate the ROM component and the microprocessor of the communications module to place the communications module in a stage one power-up condition whereat the communications module is able to negotiate communications and power requirements without being able to transmit digital electromagnetic messages among the operating modules;

(d) operating the power supply module to transmit digital electromagnetic messages to the communications module via the control port means containing information regarding the software protocol version of the control port means and the characteristics of the data port means of the power supply module;

(e) operating the communications module to transmit digital electromagnetic messages to the power supply module via the data port means containing information regarding the power requirements of the communications module;

(f) operating the power supply module to fully activate the remainder of the internal components of the communications module to place the communications module in a stage two power-up condition whereat the communications module is able to transmit digital electromagnetic messages among the operating modules;

(g) operating the communications module to transmit digital electromagnetic messages to the power supply module via the data port means containing information regarding the number and locations of the user modules and the database module;

(h) operating the power supply module to initially activate the ROM component and the microprocessor of the database module and the user modules to place the database module and the user modules in a stage one power-up condition whereat the modules are able to negotiate communications and power requirements and respond to queries from other modules without being able to perform any other operations;

(i) operating the database module and the user modules to transmit digital electromagnetic messages to the communications module via the control port means containing information regarding the software protocol version of the control port means and the characteristics of the data port means of the database module and the user modules;

(j) operating the database module and the user modules to transmit digital electromagnetic messages to the power supply module via the data port means containing information regarding the power requirements of the database module and the user modules;

(k) operating the power supply module to arrange the power bus means such that an optimal number of the user modules and the database module become operational; and (l) operating the power supply module to fully activate the remainder of the internal components of the database module and of the user modules to place the database module and the user modules in a stage two power-up condition whereat the database module and the user modules are able to perform their respective operations.

12. A method of initializing operation of an object-oriented modular electronic component system as set forth in claim 11 comprising the operations of:

(m) providing at least some of the user modules with auxiliary power supplies; and (n) operating the power supply module to transmit digital electromagnetic messages to the user modules with the auxiliary power supplies via the data port means containing instructions to begin supplying power to the power bus means.

13. A method of initializing operation of an object-oriented modular electronic component system as set forth in claim 11 including the operations of:

(m) connecting a user module to the communications module;

(n) transmitting from the control port means of the user module to the communications module a digital electromagnetic message comprising control protocol version information defining the control message formats which are characteristic of operation of the control port means of the user module;

(o) operating the communications module to determine whether digital electromagnetic messages from the control port means of the user module can be interpreted by the communications module; and (p) operating an indicator in the event of a determination in step (o) that digital electromagnetic messages from the control port means of the user module cannot be interpreted by the communications module.

14. A method of operating an object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode;

whereby configuration and operation of said modular object-oriented electronic component system may be achieved without accessing said internal electronic apparatus of any of said operating modules;

the method comprising the operations of:

(a) assigning to each of the external electromagnetic interconnecting means on the communications module an address which identifies a predetermined location for interconnection of an operating module thereto;

(b) connecting a plurality of operating modules to the communications module, each at a predetermined location identified by an address as provided in step (a); and (c) transmitting digital electromagnetic messages among the operating modules such that the digital electromagnetic messages are directed to and from each operating module connected in step (b) via the address assigned to the predetermined location at which the operating module is connected.

15. A method of operating an object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode;

whereby configuration and operation of said modular object-oriented electronic component system may be achieved without accessing said internal electronic apparatus of any of said operating modules;

the method comprising the operations of:

(a) initiating an attempted transmission of a digital electromagnetic message comprising data information from the data port means of a first user module to the data port means of a second user module;

(b) transmitting a digital electromagnetic message comprising control information from the control port means of the first user module to the communications module;

(c) operating the communications module to determine the availability of a transfer path between the data port means of the first user module and the data port means of the second user module;

(d) operating the communications module to determine the availability of the first user module and of the second user module;

(e) operating the communications module to connect the transfer path from the data port means of the first user module to the data port means of the second user module;

(f) transmitting a digital electromagnetic message comprising control information from the communications module to the control port means of the second user module;

(g) transmitting a digital electromagnetic message comprising control information from the communications module to the control port means of the first user module; and (h) transmitting the digital electromagnetic message comprising data information from the data port means of the first user module to the data port means of the second user module.

16. A method of initializing operation of an object-oriented modular electronic component system comprising:

a plurality of self-contained operating modules, each having internal electronic apparatus and external mechanical and electromagnetic means for interconnecting said internal electronic apparatus to said internal electronic apparatus of others of said operating modules including:

a user module for performing a specific end function;

a database module for identifying the presence, location, and function of each of said operating modules of said system;

a communications module for transmitting digital electromagnetic messages among said operating modules;

a power supply module for providing electrical power to said operating modules; and power bus means for delivering power from said power supply module to said operating modules;

said communications module, said power supply module, said data base module, and said user module all being capable of being selectively operatively releasably connected as a unit, mechanically and electromagnetically, said modules all being electromagnetically disconnected in an inoperative mode and being electromagnetically connected in an operative mode;

whereby configuration and operation of said modular object-oriented electronic component system may be achieved without accessing said internal electronic apparatus of any of said operating modules;

the method comprising the operations of:

(a) operating the power supply module to initially activate the ROM component and the microprocessor of the database module and the user modules to place the database module and the user modules in a stage one power-up condition whereat the modules are able to negotiate communications and power requirements and respond to queries from other modules without being able to perform any other operations; and (b) operating the power supply module to fully activate the remainder of the internal components of the database module and of the user modules to place the database module and the user modules in a stage two power-up condition whereat the database module and the user modules are able to perform their respective operations.

17. A method of initializing operation of an object-oriented modular electronic component system as set forth in claim 16 including the operations of:

(c) connecting a user module to the communications module;

(d) transmitting from the data port means of the user module to the data port means of the power supply module a digital electromagnetic message comprising the stage two power-up condition requirements of the user module;

(e) operating the power supply module to determine whether the stage two power-up condition requirements of the user module can be met by the power supply module; and (f) operating an indicator in the event of a determination in step (e) that the stage two power-up condition requirements of the user module cannot be met by the power supply module.

* * * * *